United States Patent
Park et al.

(10) Patent No.: US 12,380,184 B2
(45) Date of Patent: Aug. 5, 2025

(54) SECURE PROCESSOR PERFORMING USER AUTHENTICATION, AND ELECTRONIC DEVICE INCLUDING THE SAME

(71) Applicant: SAMSUNG ELECTRONICS CO., LTD., Suwon-si (KR)

(72) Inventors: Keunyoung Park, Suwon-si (KR); Dongjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 18/117,274

(22) Filed: Mar. 3, 2023

(65) Prior Publication Data

US 2024/0012889 A1    Jan. 11, 2024

(30) Foreign Application Priority Data

Jul. 5, 2022 (KR) .................. 10-2022-0082465

(51) Int. Cl.
G06F 21/31    (2013.01)
G06F 21/79    (2013.01)

(52) U.S. Cl.
CPC .............. G06F 21/31 (2013.01); G06F 21/79 (2013.01)

(58) Field of Classification Search
CPC ...... G06F 11/1458; G06F 21/31; G06F 21/32; G06F 21/34; G06F 21/45; G06F 21/46; G06F 21/71; G06F 21/72; G06F 21/74; G06F 21/76; G06F 21/79; G06F 21/81
See application file for complete search history.

(56) References Cited

U.S. PATENT DOCUMENTS

| | | |
|---|---|---|
| 9,076,019 B2 | 7/2015 | Gueron et al. |
| 9,460,312 B2 | 10/2016 | Brumley et al. |
| 9,621,549 B2 | 4/2017 | Benoit et al. |
| 9,710,675 B2 | 7/2017 | Durham et al. |
| 10,127,405 B2 | 11/2018 | Le Roy et al. |
| 10,243,990 B1 | 3/2019 | Chen et al. |
| 2017/0124353 A1 | 5/2017 | Arora |
| 2020/0358620 A1 | 11/2020 | Kim et al. |
| 2021/0141902 A1* | 5/2021 | Martel .................. G06F 21/57 |

* cited by examiner

*Primary Examiner* — Theodore C Parsons
(74) *Attorney, Agent, or Firm* — Sughrue Mion, PLLC

(57) ABSTRACT

Electronic device including SoC which includes secure processor performing user authentication based on authentication data received from user, and nonvolatile memory device storing first event count is disclosed. The secure processor includes volatile memory that stores failure count increasing as the user authentication fails and being reset as the user authentication succeeds, security module that restricts the user authentication of the user during first time period when the failure count reaches first threshold value, and OTP memory that stores second event count increasing as throttle level corresponding to the failure count changes. When the user authentication succeeds and when power-off request for the system on chip is generated, the first event count is updated based on the second event count. When the secure processor is powered on after the SoC is powered on, the security module compares the first and second event count to determine whether sudden power-off occurs.

20 Claims, 21 Drawing Sheets

FIG. 4

| Throttle Level | Failure Count Range | Threshold Value | Throttle Time Period(sec) |
|---|---|---|---|
| 1 | 1~5 | 5 | 30 |
| 2 | 6~10 | 10 | 300 |
| 3 | 11~20 | 20 | 600 |
| 4 | 20~50 | 50 | 1800 |
| 5 | 50~100 | 100 | 3600 |

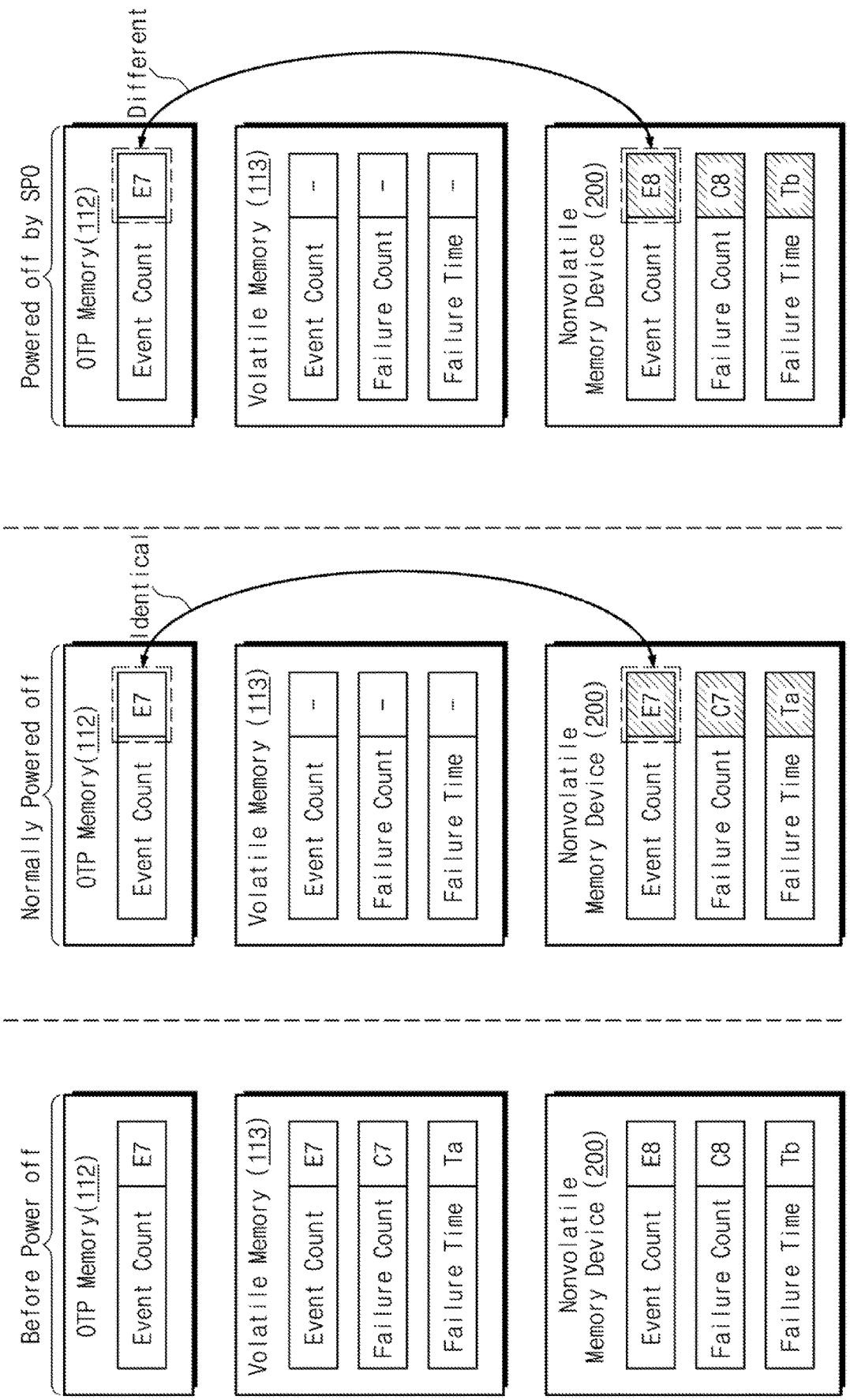

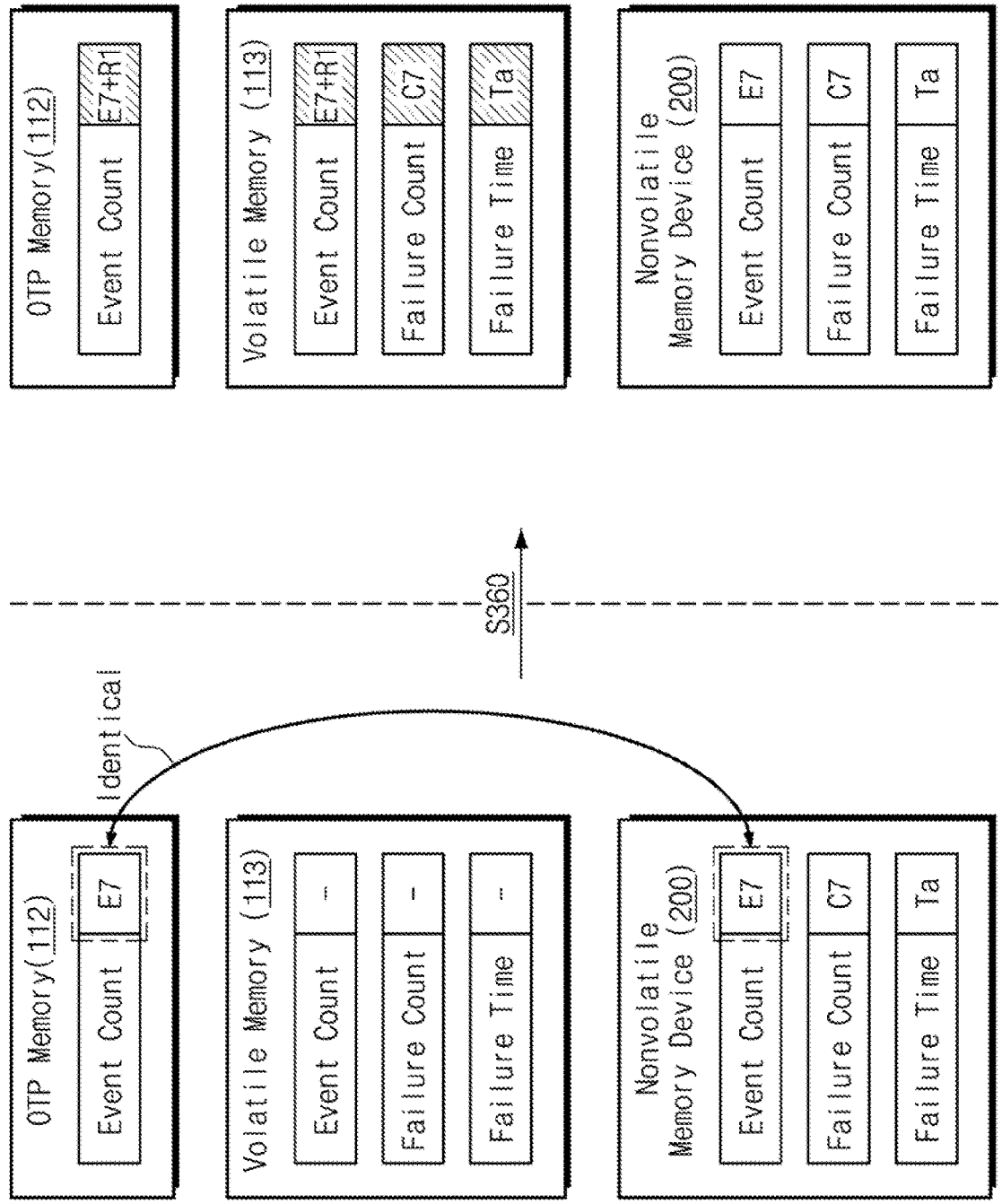

SECURE PROCESSOR PERFORMING USER AUTHENTICATION, AND ELECTRONIC DEVICE INCLUDING THE SAME

CROSS-REFERENCE TO RELATED APPLICATIONS

This application is based on and claims priority under 35 U.S.C. § 119 to Korean Patent Application No. 10-2022-0082465 filed on Jul. 5, 2022, in the Korean Intellectual Property Office, the disclosures of which are incorporated by reference herein in their entireties.

BACKGROUND

1. Field

The disclosure relates to a secure processor performing user authentication, and an electronic device including the same. More particularly, the disclosure relates to a secure processor that allows access to a user through user authentication, and an electronic device including the same.

2. Description of Related Art

Nowadays, various electronic devices support a user authentication function. That is, the electronic device receives authentication data such as a personal identification number (PIN), a password, a pattern, or a fingerprint from a user and grants the user permission to access the electronic device based on the authentication data. Accordingly, the access from the unauthorized user to the electronic device may be blocked.

To prevent the unauthorized user from gaining the permission to access through brute-force user authentication attempts, when the user authentication fails continuously, the electronic device may limit the user authentication attempts during a given time period. That is, when the user authentication fails continuously, the electronic device may be configured not to receive authentication data from the user during a pre-determined time period (e.g., a throttle time period).

However, when the power of the electronic device is turned off suddenly, the authentication records, which are stored in the electronic device, such as the number of times of user authentication failure and a user authentication failure time period may be lost. In this case, the probability that the permission of access is granted to unauthorized users through brute-force user authentication attempts may increase.

SUMMARY

Embodiments of the disclosure provide a secure processor that is protected from brute-force user authentication attempts even when a sudden power-off (SPO) event occurs, and an electronic device including the same.

According to an aspect of the disclosure, there is provided an electronic device including: a system on chip (SoC) comprising a secure processor configured to perform user authentication based on authentication data received from a user; and a nonvolatile memory device configured to store a first event count, wherein the secure processor includes: a volatile memory configured to store a failure count, which increases based on a failure of the user authentication and resets based on a success of the user authentication; a security module configured to restrict the user authentication during a first time period when the failure count reaches a first threshold value among a plurality of threshold values; and a one-time programmable (OTP) memory configured to store a second event count, which increases when a throttle level corresponding to the failure count is changed, wherein, when a power-off request for the SoC being generated and when the user authentication being successful, the first event count is updated based on the second event count, and wherein, based on the secure processor being powered on after the SoC is powered on, the security module is further configured to compare the first event count and the second event count to determine whether a sudden power-off (SPO) event occurred.

According to another aspect of the disclosure, there is provided a system on chip (SoC) including: a secure processor connected to a nonvolatile memory device storing a first event count, the secure processor configured to perform user authentication based on authentication data received from a user, wherein the secure processor further includes: a volatile memory configured to store a failure count, which increases based on a failure of the user authentication; a one-time programmable (OTP) memory configured to store a second event count; and a security module configured to restrict the user authentication during a time period corresponding to the failure count when the failure count reaches a threshold value, wherein the security module is further configured to: when the secure processor is in a power-on state, control the first and second event counts based on a throttle level corresponding to the failure count; when a power-off request for the system on chip is generated, update the first event count based on the second event count; and when the secure processor is powered on after the system on chip is powered on, compare the first event count and second event count to determine whether a sudden power-off (SPO) event occurred.

According to another aspect of the disclosure, there is provided a method of operating a secure processor, which is included in a system on chip (SoC) connected with a nonvolatile memory device and includes a volatile memory and a one-time programmable (OTP) memory, the method include: receiving a power-on request from the SoC after the SoC is powered on; obtaining an authentication record stored in the nonvolatile memory device; comparing a first event count included in the authentication record with a second event count stored in the OTP memory; determining whether a sudden power-off (SPO) event occurred, based on a result of the comparing the first event count and the second event count; based on a determination that the SPO event occurred, identifying a throttle level corresponding a failure count stored in the volatile memory before the occurrence of the SPO event, based on a difference between the first event count and the second event count; increasing the failure count to a threshold value corresponding to the identified throttle level; and restricting the user authentication during a time corresponding to the increased failure count.

According to another aspect of the disclosure, there is provided an electronic device including: a memory storing one or instructions; and a processor configured to: obtain an authentication record stored in a nonvolatile memory device; compare a first event count included in the authentication record with a second event count stored in a one-time programmable (OTP) memory; determine whether a sudden power-off (SPO) event occurred, based on a result of the comparing the first event count and the second event count.

BRIEF DESCRIPTION OF DRAWINGS

The above and other objects and features of the disclosure will become apparent by describing in detail embodiments thereof with reference to the accompanying drawings.

FIG. 4 is a table for describing an operation of a secure processor according to a failure count stored in a volatile memory of FIG. 1.

FIG. 10 is a flowchart illustrating an operation of a secure processor when an electronic device is normally powered on.

FIG. 11 is a diagram for describing operation S340 of FIG. 10.

FIGS. 12A and 12B are diagrams illustrating operation S360 of FIG. 10 in detail.

DETAILED DESCRIPTION

Hereinafter, embodiments of the disclosure will be described in detail and clearly to such an extent that one skilled in the art easily carries out the disclosure. In the following description, specific details such as detailed components and structures are merely provided to assist the overall understanding of embodiments of the disclosure. Therefore, it should be apparent to those skilled in the art that various changes and modifications of the embodiments described herein may be made without departing from the scope and spirit of the invention. In addition, the descriptions of well-known functions and structures are omitted for clarity and brevity. In the following drawings or in the detailed description, components may be connected with any other components except for components illustrated in a drawing or described in the detailed description. The terms described in the specification are terms defined in consideration of the functions in the disclosure and are not limited to a specific function. The definitions of the terms should be determined based on the contents throughout the specification.

Components that are described in the detailed description with reference to the terms "circuit", "block", etc. will be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a micro electro mechanical system (MEMS), a passive element, or a combination thereof.

Figure 1:
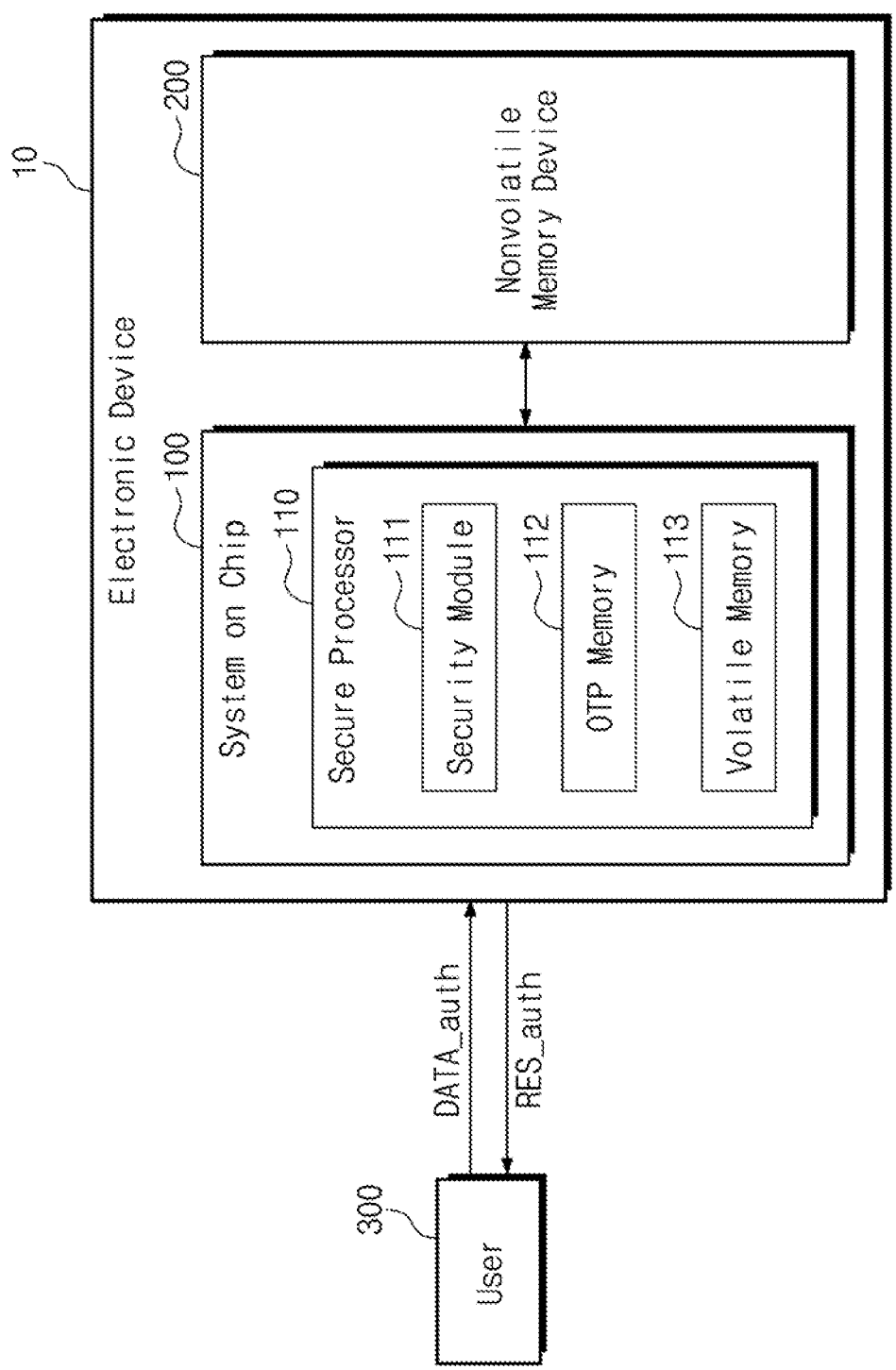
FIG. 1 is a block diagram illustrating a user authentication system according to an example embodiment of the disclosure.

FIG. 1 is a block diagram illustrating a user authentication system according to an example embodiment of the disclosure. Referring to FIG. 1, a user authentication system 1 may include a user 300 and an electronic device 10.

The electronic device 10 may include a system on chip (SoC) 100 and a nonvolatile memory device 200. According to an example embodiment, the electronic device 10 may be a device of the user, i.e., a user device. In an example embodiment, the electronic device 10 may be at least one of various electronic devices such as a personal computer, a laptop computer, a server, a workstation, a smartphone, a tablet PC, or a wearable device, or any portable electronic devices.

The system on chip 100 may control an overall operation of the electronic device 10. For example, the system on chip 100 may be an application processor (AP) configured to control the overall operation of the electronic device 10. The system on chip 100 may run an operating system, a program, or an application that is executable in the electronic device 10. In an example embodiment, the system on chip 100 may include intellectual property (IP) blocks for controlling various operations of the electronic device 10 or for controlling various components included in the electronic device 10.

The system on chip 100 may write data in the nonvolatile memory device 200, may erase data stored in the nonvolatile memory device 200, or may read data from the nonvolatile memory device 200. For example, the system on chip 100 may communicate with the nonvolatile memory device 200 based on a PCI-express (Peripheral Component Interconnect express) interface or a PCI-express based NVMe (NonVolatile Memory express) interface. However, the disclosure is not limited thereto. As such, according to other example embodiments, the system on chip 100 and the nonvolatile memory device 200 may communicate with each other, based on various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, and a CF (Compact Flash) card interface.

The electronic device 10 may operate in a lock mode for the purpose of protecting data stored in the electronic device 10. For example, the electronic device 10 may protect data stored in the nonvolatile memory device 200 by operating in the lock mode.

In order to obtain the permission to access the electronic device 10 operating in the lock mode, the user 300 may request user authentication to the electronic device 10. For example, the user 300 may provide authentication data DATA_auth to the electronic device 10. The electronic device 10 may perform user authentication based on the received authentication data DATA_auth.

In an example embodiment, the lock mode may refer an operating mode of the electronic device 10 before the user authentication succeeds. The electronic device 10 operating in the lock mode may not grant the user 300 permission to access the electronic device 10. For example, when the electronic device 10 operates in the lock mode, the user 300 may be blocked from accessing the data stored in the nonvolatile memory device 200.

The electronic device 10 may generate a passcode based on the authentication data DATA_auth. The electronic device 10 may determine whether the generated passcode (e.g., referred to as an "input passcode") corresponds to a passcode stored in the electronic device 10. The passcode stored in the electronic device 10 may be referred to as a "stored passcode". The electronic device 10 may return a user authentication result RES_auth to the user 300. The user authentication result RES_auth may be success or failure of user authentication.

In detail, the system on chip 100 of the electronic device 10 may include a secure processor 110. According to an example embodiment, the secure processor 110 may include a security module 111, an OTP memory 112 and a volatile memory 113. However, the disclosure is not limited thereto, and as such, the secure processor 110 may include other components or modules.

According to an example embodiment, the security module 111 may generate the input passcode based on the authentication data DATA_auth. When the input passcode corresponds to the passcode (i.e., the stored passcode) stored in the nonvolatile memory device 200, the security module 111 may determine that the user authentication succeeds. When the input passcode does not correspond to the stored passcode, the security module 111 may determine that the user authentication fails.

In an example embodiment, the security module 111 may compare the input passcode and the stored passcode. When the input passcode and the stored passcode are matched, the security module 111 may determine that the user authentication succeeds (i.e., the input passcode corresponds to the stored passcode). Below, an example embodiment where the security module 111 performs user authentication by comparing the input passcode and the stored passcode will be described as an example. However, the disclosure is not limited thereto. For example, the security module 111 may determine whether the input passcode corresponds to the stored passcode, by using a separate encryption algorithm.

Briefly, an example embodiment where the authentication data DATA_auth are converted into the input passcode by the security module 111 will be described as an example. However, the disclosure is not limited thereto. For example, the authentication data DATA_auth may be converted into the input passcode by some of components of the system on chip 100 or by some of components of the secure processor 110.

Also, an example embodiment where the stored passcode is stored in the nonvolatile memory device 200 will be described as an example. In this case, costs for implementing the secure processor 110 may decrease. However, the disclosure is not limited thereto. For example, the stored passcode may be stored in a separate nonvolatile memory device connected with the secure processor 110 through a secure channel. In this case, the secure channel may not be accessed by any other components of the system on chip 100. That is, a location where the stored passcode is stored is not limited to the above examples.

According to an example embodiment, when the secure processor 110 determines that the user authentication succeeds, the electronic device 10 may enter an unlock mode. In this case, the user 300 may obtain the permission to access the electronic device 10. For example, the user 300 may read data stored in the nonvolatile memory device 200.

In an example embodiment, the authentication data DATA_auth may be data that correspond to one of various types of data such as a personal identification number (PIN), a password, a pattern, a fingerprint, and a face recognition image. However, the disclosure is not limited thereto, and as such, the authentication data DATA_auth may include other information for identifying a user, including, but not limited to other types of biometric information.

In an example embodiment, the electronic device 10 may notify the user 300 of the user authentication result RES_auth in various manners such as pop-up, text exposure, screen transition, vibration, and audio output. However, the manner where the electronic device 10 notifies the user 300 of the user authentication result RES_auth is not limited to the above examples.

According to an example embodiment, when the user authentication fails continuously, the secure processor 110 may restrict the user authentication during a given time. For example, the secure processor 110 may include a volatile memory 113. The volatile memory 113 may store a record associated with user authentication. The record associated with user authentication may be referred to as an "authentication record".

The authentication record may include a count indicating the number of times continuous failure of user authentication. This count may be referred to as a "failure count". When the failure count reaches a specific value, the security module 111 may restrict the user authentication during a given time period. The specific value may be a threshold value and the given time period maybe referred to as a throttle time period. That is, the security module 111 may apply the throttle time period to user authentication, based on the failure count. According to an example embodiment, the specific value may be a predetermined value, and/or the throttle time period may be a predetermined time period.

The authentication record may include a time point which indicates when the user authentication fails. This time point may be referred to as a "failure time". For example, the security module 111 may store information about a time point, at which the failure count reaches the threshold value as the user authentication fails, in the volatile memory 113 as a failure time point. The security module 111 may determine whether the throttle time period elapses from the failure time point. Below, the throttle time period according to the failure count will be described in detail with reference to FIG. 4.

According to an example embodiment, while the throttle time period is applied (i.e., until it is determined by the security module 111 that the throttle time period elapses), the electronic device 10 may operate in a user authentication restriction mode. That is, the electronic device 10 may restrict an authentication request from the user 300 such that the authentication data DATA_auth are not received from the user 300. For example, the electronic device 10 may block the receiving of the authentication data DATA_auth from the user 300. In this case, the electronic device 10 may be protected from brute-force user authentication attempts of the unauthorized user (i.e., an unjustified user).

Meanwhile, the secure processor 110 may be provided with a power from the system on chip 100. Accordingly, when the system on chip 100 is powered off, the secure processor 110 may also be powered off.

The secure processor 110 may include a one-time programmable (OTP) memory 112. In an example embodiment, data that are stored in the OTP memory 112 may be un-erasable and may not be lost even though the power supplied to the OTP memory 112 is blocked. However, the disclosure is not limited thereto.

The OTP memory 112 may store an event count that increases whenever a specific event occurs. For example, the event count stored in the OTP memory 112 may increase only when the failure count reaches one or more specific values, not whenever the failure count increases. That is, the event count may not increase every time a failure count increase, but instead, the event count may increase when the failure count reaches one or more specific values. In this case, the capacity of the OTP memory 112, which is needed to store the event count, may decrease.

The security module 111 may store the authentication record present in the volatile memory 113 in the nonvolatile memory device 200. For example, when the user authentication succeeds, the security module 111 may back up the authentication record present in the volatile memory 113 to the nonvolatile memory device 200. Also, in response to a power-off request for the system on chip 100 (or the electronic device 10) being generated, the security module 111 may back up the authentication record present in the volatile memory 113 to the nonvolatile memory device 200. In this case, the authentication record backed up to the nonvolatile memory device 200 may be referred to as a "backup authentication record".

According to an example embodiment, it is assumed that the term "authentication record" refers to an authentication record stored in the volatile memory 113, not the authentication record (or backup authentication record) backed up to the volatile memory 113, unless otherwise expressed in the context. Also, it is assumed that the term "failure count" refers to the failure count of the authentication record stored in the volatile memory 113, not the failure count of the backup authentication record stored in the nonvolatile memory device 200 unless otherwise expressed in the context.

In an example embodiment, when the power of the electronic device 10 (or the system on chip 100) is suddenly blocked (i.e., when the sudden power-off (SPO) event occurs), the authentication record stored in the volatile memory 113 may be lost. For example, when there is a physical security attack from the outside, such as forcible power-off or battery disconnection, the electronic device 10 may be powered off in an abnormal manner. In this case, the system on chip 100 and the secure processor 110 may be powered off, and the authentication record, which is stored in the volatile memory 113, such as a failure count and a failure time point may be lost.

In an example embodiment, when the secure processor 110 is powered on for the first time after the system on chip 100 (or the electronic device 10) is powered on (i.e., when the secure processor 110 is again powered on), the security module 111 may determine whether the SPO event occurs, based on the backup authentication record stored in the nonvolatile memory device 200 and the event count stored in the OTP memory 112. For example, while the secure processor 110 is being powered on for the first time after the system on chip 100 is powered on, the security module 111 may determine whether the SPO event occurs. An example embodiment where a determination by the security module 111 on whether the SPO event occurs while the secure processor 110 is being powered on for the first time after the system on chip 100 is powered on will be described below. However, the disclosure is not limited thereto. For example, the secure processor 110 may be powered on for the first time after the system on chip 100 is powered on, and then, when user authentication is requested for the first time, the security module 111 may determine whether the SPO occurs.

According to an example embodiment, when the security module 111 determines that the SPO occurs, the security module 111 may restore the authentication record based on the backup authentication record and the event count of the OTP memory 112. Accordingly, even though the power of the electronic device 10 is suddenly blocked, the electronic device 10 may be protected from brute-force user authentication attempts. How to restore an authentication record based on an event count will be described with reference to the following drawings.

Figure 2:
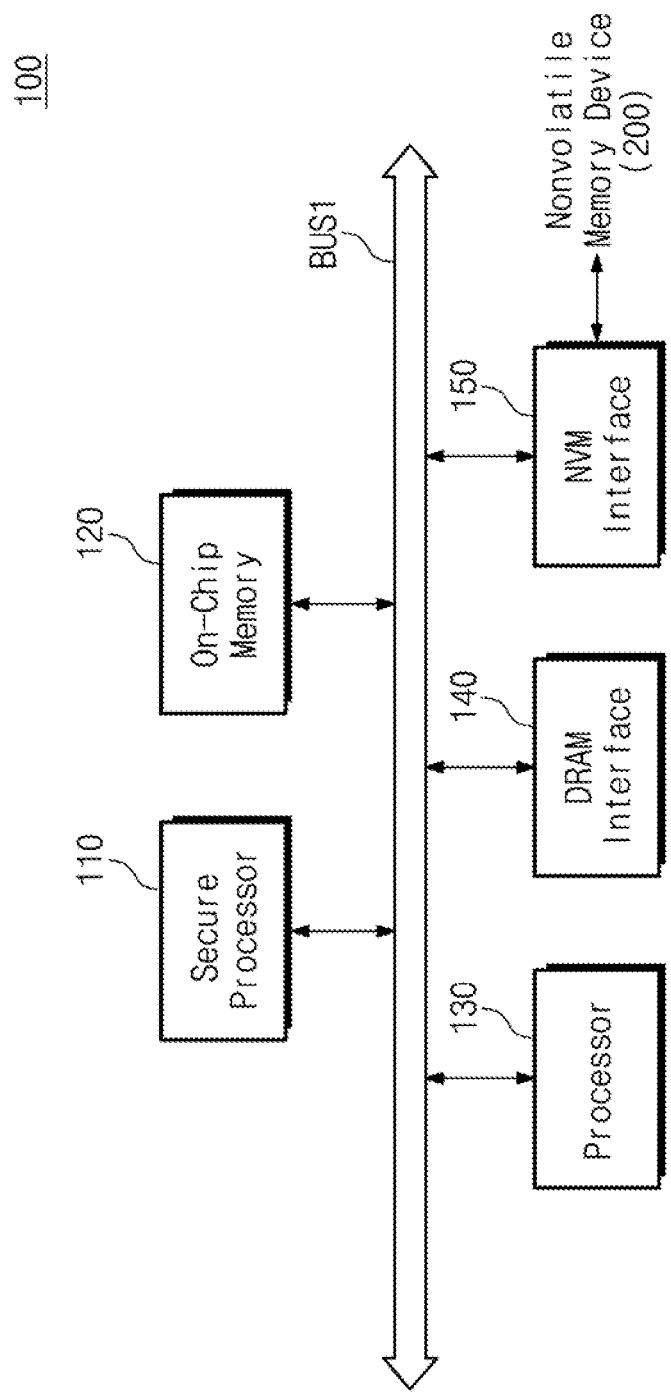
FIG. 2 is a block diagram illustrating a system on chip of FIG. 1 in detail.

FIG. 2 is a block diagram illustrating a system on chip (SoC) of FIG. 1 in detail. According to an example embodiment, the system on chip 100 may include the secure processor 110, an on-chip memory 120, a processor 130, a dynamic random access memory (DRAM) interface 140, and an NVM interface 150. The secure processor 110, the on-chip memory 120, the processor 130, the DRAM interface 140, and the NVM interface 150 may be connected with each other through a first bus BUS1.

The on-chip memory 120 may be configured to drive the electronic device 10. According to an example embodiment, the on-chip memory 120 may include one or more components, such as an application program, an operating system, a file system, and a device driver. The various components included in the on-chip memory 120 may be provided in the form of software or firmware and may be driven by the processor 130.

The processor 130 may control an overall operation of the system on chip 100. The processor 130 may execute various software stored in or loaded to the on-chip memory 120. According to an example embodiment, the various software may include, but not limited to, an application program, an operating system, a file system, and a device driver. The processor 130 may include homogeneous multi-core processors or heterogeneous multi-core processors. For example, the processor 130 may include at least one of various information processing devices such as a central processing unit (CPU), an image signal processing unit (ISP), a digital signal processing unit (DSP), a graphics processing unit (GPU), a vision processing unit (VPU), and a neural processing unit (NPU).

The processor 130 may communicate with a dynamic random access memory (DRAM) device through the DRAM interface 140. The processor 130 may control the DRAM device through the DRAM interface 140. The processor 130 may communicate with the nonvolatile memory device 200 through the NVM interface 150. The processor 130 may control the nonvolatile memory device 200 through the NVM interface 150.

According to an example embodiment, the secure processor 110 may be isolated from the other components of the system on chip 100. That is, the secure processor 110 may be configured not to be directly accessed from the other components of the system on chip 100. For example, the secure processor 110 may perform communication in the system on chip 100 through a mail box manner. Also, the secure processor 110 may include components, which are independent of the other components of the system on chip 100, such as a processor, a read only memory (ROM), and a random access memory (RAM). Accordingly, the secure processor 110 may internally perform user authentication. A configuration and an operation of the secure processor 110 will be described in detail with reference to FIG. 3.

Figure 3:
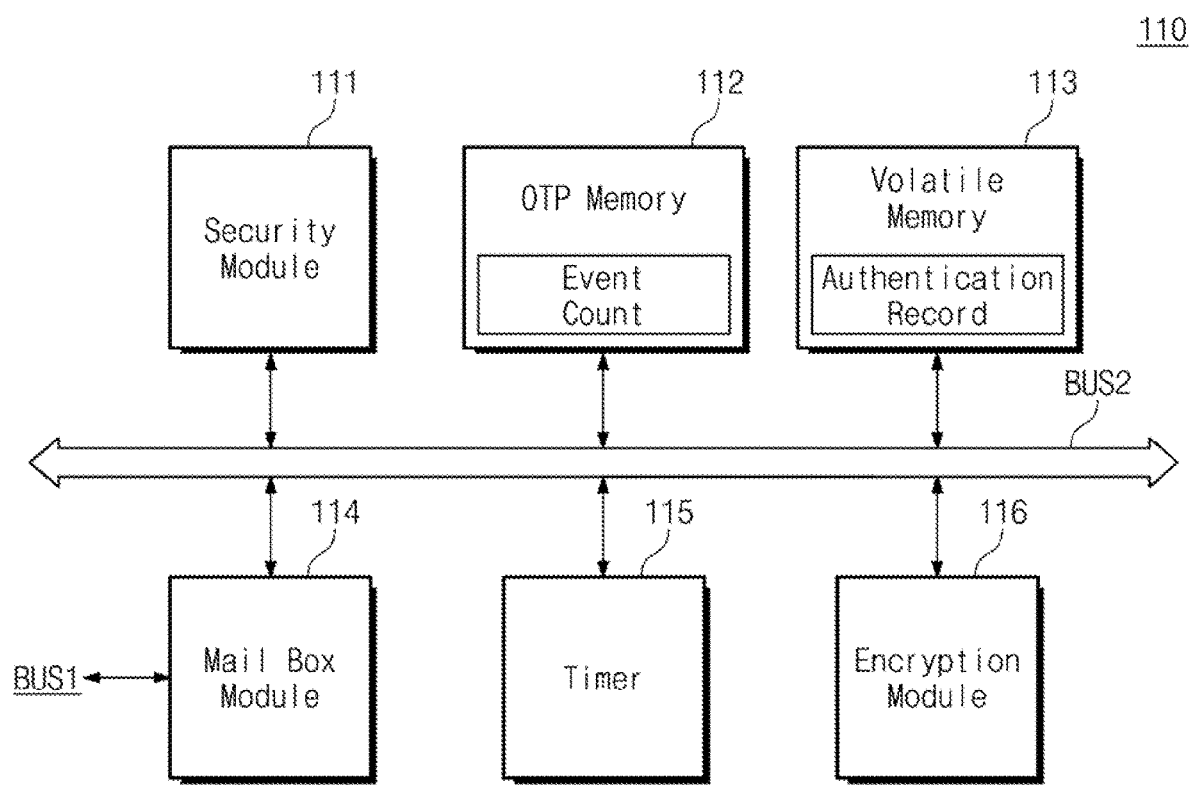
FIG. 3 is a block diagram illustrating a secure processor of FIG. 2 in detail.

FIG. 3 is a block diagram illustrating a secure processor of FIG. 2 in detail. Referring to FIGS. 1 to 3, the secure processor 110 may include the security module 111, the OTP memory 112, the volatile memory 113, a mail box module 114, a timer 115, and an encryption module 116. The security module 111, the OTP memory 112, the volatile memory 113, the mail box module 114, the timer 115, and the encryption module 116 may be connected with each other through a second bus BUS2.

According to an example embodiment, the various modules or units included in the secure processor 110 may be provided in the form of hardware, software or combination of both hardware and software. For example, according to an example embodiment, the security module 111, the mail box module 114, the timer 115, and the encryption module 116 may be implemented by hardware, such as electronic circuitry. According to another example embodiment, the secure processor 110 may execute various software to implement the security module 111, the mail box module 114, the timer 115, and the encryption module 116. According to an example embodiment, the various software may include, but not limited to, an application program, codes or instructions to perform various operations.

According to an example embodiment, the security module 111 may control an overall operation of the secure processor 110, which performs the user authentication. For example, the security module 111 may generate the passcode based on the authentication data DATA_auth. The security module 111 may perform the user authentication by comparing the generated passcode (i.e., the input passcode) with the stored passcode. The security module 111 may manage data stored in the nonvolatile memory device 200, the OTP memory 112, and the volatile memory 113, based on whether the user authentication succeeds.

According to an example embodiment, the OTP memory 112 may store an event count. The event count stored in the OTP memory 112 is referred to as a "first event count". The first event count may increase under control of the security module 111. The first event count may be maintained even though the system on chip 100 is powered off.

The volatile memory 113 may store an authentication record. The authentication record may include an event count, a failure count, and a failure time point. In this case, the event count stored in the volatile memory 113 may be referred to as a "second event count". The second event count may be lost when the system on chip 100 (or the electronic device 10) is powered off.

In an example embodiment, the authentication record stored in the volatile memory 113 may be maintained even though the secure processor 110 is powered off. For example, to reduce power consumption of the electronic device 10, the secure processor 110 may be powered off while the system on chip 100 is operating in a power-on state. However, when the system on chip 100 is in the power-on state, even though the secure processor 110 is in a power-off state, the authentication record stored in the volatile memory 113 may not be lost. That is, the volatile memory 113 may receive power and be in an operational state, even though the secure processor 110 is in a power-off state. In this case, the number of times of update of the event count stored in the OTP memory 112 may be minimized.

The mail box module 114 may be connected with the first bus BUS1. The mail box module 114 may support the mail box-based communications between the system on chip 100 and the secure processor 110. For example, the mail box module 114 may receive a command or a request from the system on chip 100 (or any other component(s) of the system on chip 100) through the first bus BUS1. In this case, the secure processor 110 may determine an operation to be performed, in response to the command or the request received through the mail box module 114.

The authentication record of the volatile memory 113 may be updated under control of the security module 111. For example, when the user authentication succeeds, the failure count may be reset (e.g., to "0"). On the other hand, when the user authentication fails, the failure count may increase (e.g., as much as "1").

Also, the second event count may be changed depending on the first event count. For example, under control of the security module 111, the second event count may be controlled to have the same value as the first event count. That is, when a value of the first event count is changed, a value of the second event count may be changed. That is, when the secure processor 110 is in the power-on state, the event count stored in the volatile memory 113 may have the same value as the event count of the OTP memory 112.

In an example embodiment, the volatile memory 113 may be implemented with a flip-flop or a static random access memory (SRAM). However, the disclosure is not limited thereto. For example, the volatile memory 113 may be implemented with various types of volatile memories such as a DRAM.

According to an example embodiment, when the user authentication fails continuously, the security module 111 may restrict the user authentication during a given time. That is, when the failure count of the volatile memory 113 reaches one of a plurality of threshold values, the security module 111 may allow the electronic device 10 to operate in the user authentication restriction mode during a throttle time period corresponding to the threshold value coinciding with the failure count. For example, the security module 111 may store the failure time point (or a time point determined as the failure count reaches the threshold value) in the volatile memory 113. The security module 111 may determine whether the throttle time period elapses from the failure time point, by using the timer 115.

The security module 111 may back up the authentication record present in the volatile memory 113 to the nonvolatile memory device 200. In this case, the authentication record stored in the nonvolatile memory device 200 may be referred to as a "backup authentication record", and the event count included in the backup authentication record may be referred to as a "third event count".

For example, when the user authentication succeeds, the security module 111 may update the authentication record of the volatile memory 113 and may back up the updated authentication record to the nonvolatile memory device 200. In detail, when the user authentication succeeds, the security module 111 may set (or reset) the failure count of the volatile memory 113 to "0". As such, the failure count of the backup authentication record may be set to "0".

In an example embodiment, as a specific event occurs, the security module 111 may increase the first event count stored in the OTP memory 112. For example, when a throttle level according to the failure count of the volatile memory 113 is changed, the security module 111 may increase the first event count. In detail, according to an example embodiment, when the failure count of the volatile memory 113 increases for the first time after the user authentication succeeds (i.e., when the failure count increases from "0" to "1"), the security module 111 may increase the first event count as much as "1". Also, when the failure count of the volatile memory 113 increases for the first time after the failure count reaches one of the plurality of threshold values (i.e., when the failure count increases to a value greater than the threshold value as much as "1"), the security module 111 may increase the first event count as much as "1". In this case, as described above, a value of the second event count may also increase as much as "1".

In an example embodiment, the power-off request for the system on chip 100 may be generated. For example, the power-off request for the system on chip 100 may be generated by the user 300 or by the application program executed by the electronic device 10. In this case, the system on chip 100 may notify the secure processor 110 that the system on chip 100 is scheduled for power-off and may provide the power-off request to the secure processor 110. The secure processor 110 may perform a power-off procedure normally depending on the notification and the request received from the system on chip 100. For example, the security module 111 may store the authentication record (e.g., an event count, a failure count, and a failure time point) present in the volatile memory 113 in the nonvolatile memory device 200.

In an example embodiment, the sudden power-off (SPO) event may occur in the electronic device 10 (or the system on chip 100). In this case, the secure processor 110 may be powered off in a state where the normal power-off procedure is not completely performed. Accordingly, because the authentication record present in the volatile memory 113 is not completely stored in (or backed up to) the nonvolatile memory device 200, the authentication record present in the volatile memory 113 may be lost.

In an example embodiment, the secure processor 110 may perform a power-on procedure (e.g., a booting process) in response to that the power-on request is received from the system on chip 100 for the first time after the system on chip 100 is powered on. In this case, the security module 111 may determine whether the SPO event occurs, by comparing the first event count present in the OTP memory 112 and the third event count present in the nonvolatile memory device 200. For example, when the first event count and the third event count are identical to each other, the security module 111 may determine that the electronic device 10 (or the system on chip 100) is not powered off by the SPO event (i.e., electronic device 10 is normally powered off). On the other hand, when the first event count and the third event count are different from each other, the security module 111 may determine that the electronic device 10 (or the system on chip 100) is powered off by the SPO event. That is, when the first event count and the third event count are different from each other, the security module 111 may detect the occurrence of the SPO event.

According to an example embodiment, when the occurrence of the SPO event is detected by the security module 111, the security module 111 may update an authentication record of the volatile memory 113 based on a difference between the first event count and the third event count. For example, based on a difference between the first event count and the third event count, the security module 111 may identify a range of a value of the failure count of the volatile memory 113 before the occurrence of the SPO event. The security module 111 may increase the failure count of the volatile memory 113 based on the identified range of the value of the failure count (e.g., to a threshold value corresponding to an upper limit of a failure count range). Also, the security module 111 may update the failure time point of the volatile memory 113 so as to be set to a current time point (e.g., a time point at which the SPO event is detected). An operation that the secure processor 110 performs when the SPO event is detected will be described in detail with reference to FIGS. 4 to 6, 10 to 12, 13A, and 13B.

In an example embodiment, the security attack using brute-force user authentication attempts may be prevented by updating the failure count and the failure time point of the volatile memory 113 when the occurrence of the SPO event is detected by the security module 111. Also, a storage capacity of the OTP memory 112 may be minimized by minimizing the number of times that the event count (i.e., the first event count) of the OTP memory 112 is updated.

In an example embodiment, the nonvolatile memory device 200 may store data (e.g., the backup authentication record and/or the stored passcode) in an encrypted form. For example, by using the encryption module 116, the security module 111 may encrypt data (e.g., the authentication record and/or the input passcode) to be stored in the nonvolatile memory device 200 or may decrypt data (e.g., the backup authentication record and/or the stored passcode) fetched from the nonvolatile memory device 200.

In an example embodiment, the encryption module 116 may generate an encryption key based on the first event count. That is, the encryption key may be changed continuously as the first event count is updated. Before backing up the authentication record to the nonvolatile memory device 200, the encryption module 116 may perform an encryption operation based on the generated encryption key. As such, the authentication record backed up to the nonvolatile memory device 200 may be in a state of being encrypted based on the first event count.

In an example embodiment, the encryption module 116 may generate the encryption key based on a private key allocated to the secure processor 110. Before backing up the authentication record to the nonvolatile memory device 200, the encryption module 116 may perform an encryption operation based on the generated encryption key. That is, the authentication record stored in the nonvolatile memory device 200 may be in a state of being encrypted based on the private key.

In an example embodiment, the encryption module 116 may encrypt the authentication record to be backed up, based on the first event count and/or the private key of the secure processor 110. As such, when the security module 111 fetches the authentication record backed up to the nonvolatile memory device 200, the security module 111 may determine whether the falsification (e.g., a rollback of the failure count and/or the failure time point) is made in the backup authentication record, through the encryption module 116. When the security module 111 fetches the authentication record backed up to the nonvolatile memory device 200, the encryption module 116 may determine whether backup authentication record is present in the secure processor 110. Accordingly, the security of the electronic device 10 may be improved.

FIG. 4 is a table for describing an operation of a secure processor according to a failure count stored in a volatile memory of FIG. 1. Referring to FIGS. 1, 3, and 4, the volatile memory 113 may store the failure count. The failure count may increase by "1" in response to that user authentication fails.

In an example embodiment, a throttle level may be determined depending on a failure count range in which a value of the failure count is included. For example, when the failure count is greater than or equal to "1" and less than or equal to "5" (i.e., when the failure count is included in a first failure count range), the throttle level may be defined to be "1"; when the failure count is greater than or equal to "6" and less than or equal to "10" (i.e., when the failure count is included in a second failure count range), the throttle level may be defined to be "2"; when the failure count is greater than or equal to "11" and less than or equal to "20" (i.e., when the failure count is included in a third failure count range), the throttle level may be defined to be "3"; when the failure count is greater than or equal to "20" and less than or equal to "50" (i.e., when the failure count is included in a fourth failure count range), the throttle level may be defined to be "4"; and, when the failure count is greater than or equal to "50" and less than or equal to "100" (i.e., when the failure count is included in a fifth failure count range), the throttle level may be defined to be "5". In this case, an upper limit of each failure count range may be referred to as a "threshold value".

According to an example embodiment, when the failure count is "0", the throttle level is defined to be "0". As such, when the failure count increases from 0 to 1, the throttle level is changed from 0 to 1. However, the disclosure is not limited thereto.

When the failure count reaches one of the plurality of threshold values, the security module 111 may apply the throttle time period to the user authentication. A throttle time period may be differently determined depending on the throttle level. For example, when the throttle level is high, the throttle time period may be applied to be longer.

For example, when the failure count reaches threshold value 5, the electronic device 10 may operate in the user authentication restriction mode for 30 seconds; when the failure count reaches threshold value 10, the electronic device 10 may operate in the user authentication restriction mode for 300 seconds; when the failure count reaches threshold value 20, the electronic device 10 may operate in the user authentication restriction mode for 600 seconds; when the failure count reaches threshold value 50, the electronic device 10 may operate in the user authentication restriction mode for 1800 seconds; and when the failure count reaches threshold value 100, the electronic device 10 may operate in the user authentication restriction mode for 3600 seconds.

In an example embodiment, throttle levels, failure count ranges, throttle levels, and throttle time periods may be determined in advance. Also, FIG. 4 illustrates example values of throttle levels, failure count ranges, throttle levels, and throttle time periods, but the disclosure is not limited thereto. As such, according to other example embodiments, values of throttle levels, failure count ranges, throttle levels, and throttle time periods may be different.

In an example embodiment, when the security module 111 detects the occurrence of the SPO event, the security module 111 may determine the throttle level corresponding to the failure count that is stored in the volatile memory 113 before the occurrence of the SPO event. For example, when a value of the failure count stored in the volatile memory 113 before the occurrence of the SPO event is "8" (i.e., is included in the failure count range from 5 to 10), the security module 111 may determine that the throttle level is "2". According to an example embodiment, the security module 111 may determine the throttle level corresponding to the failure count before the occurrence of the SPO event as described in detail below with reference to the following drawings.

In an example embodiment, the security module 111 may increase the failure count of the volatile memory 113 to a throttle level corresponding to the determined throttle level. For example, when the security module 111 determines that the throttle level is 2, the failure count of the volatile memory 113 may be increased to the upper limit (e.g., "10") of the failure count range (e.g., from 6 to 10) corresponding to the throttle level of "2". In this case, because the failure count of the volatile memory 113 reaches the threshold value of "10", the security module 111 may allow the electronic device 10 to operate in the user authentication restriction mode for 300 seconds.

That is, according to an example embodiment of the disclosure, when the occurrence of the SPO event is detected, the failure count of the volatile memory 113 may be set to the upper limit of the failure count range in which the value of the failure count before the occurrence of the SPO event is included. Accordingly, the electronic device 10 may be protected from the security attack using brute-force user authentication attempts and the SPO.

Figure 5:
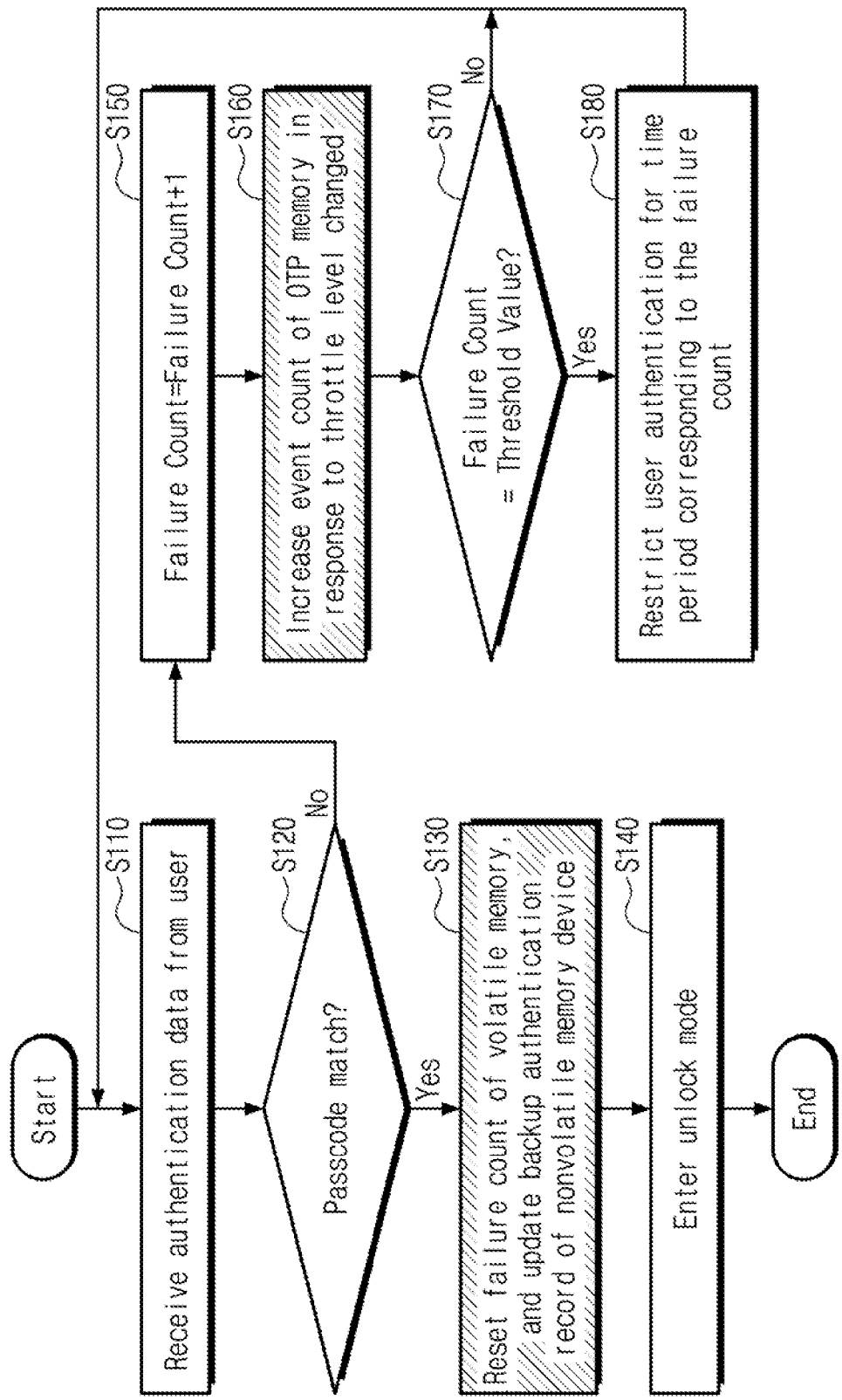
FIG. 5 is a flowchart illustrating an operation of the electronic device 10 according to an example embodiment of the disclosure.

FIG. 5 is a flowchart illustrating an operation of the electronic device 10 according to an example embodiment of the disclosure. Referring to FIGS. 1 and 5, in operation S110, the electronic device 10 may receive authentication information from a user. For example, the electronic device 10 may receive the authentication data DATA_auth from the user 300. In this case, the electronic device 10 may generate the input passcode based on the authentication data DATA_auth. For example, the system on chip 100 or the security module 111 of the electronic device 10 may generate the input passcode based on the authentication data DATA_auth.

In operation S120, the electronic device 10 may determine whether passcodes are matched. For example, the security module 111 may determine whether the passcode (i.e., the stored passcode) stored in the nonvolatile memory device 200 corresponds to the input passcode.

When the security module 111 determines, in operation S120, that the passcodes are matched, operation S130 and operation S140 may be performed. For example, when the security module 111 determines that the passcode (i.e., the stored passcode) stored in the nonvolatile memory device 200 matches the input passcode, operation S130 may be performed.

In operation S130, the electronic device 10 may reset the failure count present in the volatile memory 113. The electronic device 10 may update the backup authentication record present in the nonvolatile memory device 200 depending on information of the volatile memory 113. For example, in operation S130, the security module 111 may set the failure count of the authentication record present in the volatile memory 113 to "0". Then, the security module 111 may back up the authentication record present in the volatile memory 113 to the nonvolatile memory device (NVM) 200. In this case, the failure count of the backup authentication record stored in the nonvolatile memory device 200 may be "0".

In operation S140, the electronic device 10 may enter the unlock mode. In this case, the user 300 may obtain the permission to access the electronic device 10. For example, the user 300 may perform various operations on data stored in the nonvolatile memory device 200, such as a read operation, a write operation, and an erase operation.

When the security module 111 determines, in operation S120, that the passcodes are not matched, operation S150 to S180 may be performed. For example, when the security module 111 determines that the passcode (i.e., the stored passcode) stored in the nonvolatile memory device 200 does not match the input passcode, operation S150 may be performed.

In operation S150, the electronic device 10 may increase the failure count. For example, the security module 111 may increase the failure count present in the volatile memory 113 as much as "1".

In operation S160, the electronic device 10 may increase the event count present in the OTP memory 112 in response to that the throttle level is changed. For example, when the throttle level is changed as the failure count is increased in operation S150, the security module 111 may increase the event count (i.e., the first event count) of the OTP memory 112. In this case, the security module 111 may increase the event count (i.e., the second event count) of the volatile memory 113 based on the first event count. In this case, the event count of the volatile memory 113 may have the same value as the event count of the OTP memory 112.

In an example embodiment, the throttle level may be changed when the failure count is increased for the first time after the user authentication succeeds. For example, when the failure count increases from 0 to 1, the throttle level may be set to "1", that is, the throttle level may be changed. Alternatively, the throttle level may be changed when the failure count is increased for the first time after reaching one of threshold values. For example, referring to FIG. 4, when the failure count increases from 10 to 11, the throttle level may increase from 2 to 3, that is, the throttle level may be changed. That is, according to an example embodiment of the disclosure, the throttle level change may mean that the failure count of the volatile memory 113 enters a new failure count range.

In operation S170, the electronic device 10 may determine whether the failure count reaches a threshold value. For example, the security module 111 may determine whether the failure count of the volatile memory 113 is matched with one of a plurality of threshold values (e.g., "5", "10", "20", "50", and "100" of FIG. 4). When it is determined that the failure count does not reach the threshold value, operation S110 may again be performed. That is, when the failure count does not reach the threshold value, the electronic device 10 may permit the user authentication attempt of the user 300. In contrast, when it is determined that the failure count reaches the threshold value, operation S180 may be performed.

In operation S180, the electronic device 10 may restrict the user authentication during a time corresponding to the failure count. For example, the electronic device 10 may restrict the user authentication during a time corresponding to the threshold value that the failure count reaches. That is, the electronic device 10 may operate in the user authentication restriction mode during the throttle time period that is in advance determined depending on the throttle level. In this case, the electronic device 10 may block the receiving of the authentication data DATA_auth from the user 300.

In an example embodiment, when the secure processor 110 operates in the power-on state, through operation S130 and operation S160, a difference between the first and third event counts may be controlled to correspond to the throttle level associated with the failure count. For example, when the user authentication succeeds, the third event count may be controlled to have the same value as the first event count. In contrast, the first event count may be updated when the throttle level is changed as the failure count increases. Accordingly, when the throttle level is changed depending on the increase in the failure count, there may be a difference between the first event count and the third event count. Accordingly, as described above, the difference between the first event count and the third event count may correspond to the throttle level associated with the failure count.

In an example embodiment, after operation S180 is completed, operation S110 may again be performed. For example, through the timer 115, the security module 111 may determine that the throttle time having a given time period elapses from the failure time point stored in the volatile memory 113. In this case, under control of the security module 111, the electronic device 10 may again enter the lock mode and may permit the user authentication attempt of the user 300.

In an example embodiment, when the electronic device 10 (or the system on chip 100) is powered off, the authentication record stored in the volatile memory 113 may be initialized (or lost). As such, to prevent the evasion of the user authentication restriction mode through the initialization of the authentication record, the electronic device 10 may back up the authentication record present in the volatile memory 113 to the nonvolatile memory device 200 in response to that the power-off request for the system on chip 100 is generated. How the electronic device 10 operates depending on the power-off request will be described in detail with reference to FIGS. 9A and 9B.

In an example embodiment, when the secure processor 110 is powered on for the first time after the electronic device 10 is powered on (i.e., while the secure processor 110 is booted up for the first time after the electronic device 10 is powered on), the electronic device 10 may determine whether the SPO event occurs, by comparing the backup authentication record present in the nonvolatile memory device 200 and the event count of the OTP memory 112. In detail, the security module 111 may determine whether the SPO event occurs, by comparing the event count of the backup authentication record and the event count of the OTP memory 112. According to an example embodiment, the occurrence of an SPO event may be determined as described in detail below with reference to FIGS. 10 and 11.

In an example embodiment, when the occurrence of the SPO event is not detected, the third event count (i.e., the event count of the backup authentication record) may correspond to the second event count (i.e., the event count backed up from the volatile memory 113 as the power-off request for the system on chip 100 is generated. Meanwhile, the second event count may have the same value as the first event count (i.e., the event count of the OTP memory 112). This is because the event counts of the volatile memory 113 and the OTP memory 112 increase together. In this case, the third event count of the backup authentication record may have a value that is stored (e.g., stored in operation S160) as a specific event occurs (e.g., when the throttle level is changed). In this case, the electronic device 10 may restore the volatile memory 113 by using the backup authentication record. According to an example embodiment, operations of the electronic device 10 when the occurrence of the SPO event is not detected while the secure processor 110 is powered on (i.e., is booted up) will be described in detail with reference to FIGS. 10, 11, 12A, and 12B.

On the other hand, when the occurrence of the SPO event is detected, the third event count (i.e., the event count of the backup authentication record) may have a value that is stored (e.g., stored in operation S130) when the user authentication succeeds lastly. In this case, the electronic device 10 may update the authentication record of the volatile memory 113 based on a difference between the first event count and the third event count. According to an example embodiment, an operation of the electronic device 10 when the occurrence of the SPO event is detected while the secure processor 110 is booted up for the first time after the electronic device 10 is powered on will be described in detail with reference to FIGS. 10, 13A, and 13B.

Figure 6:
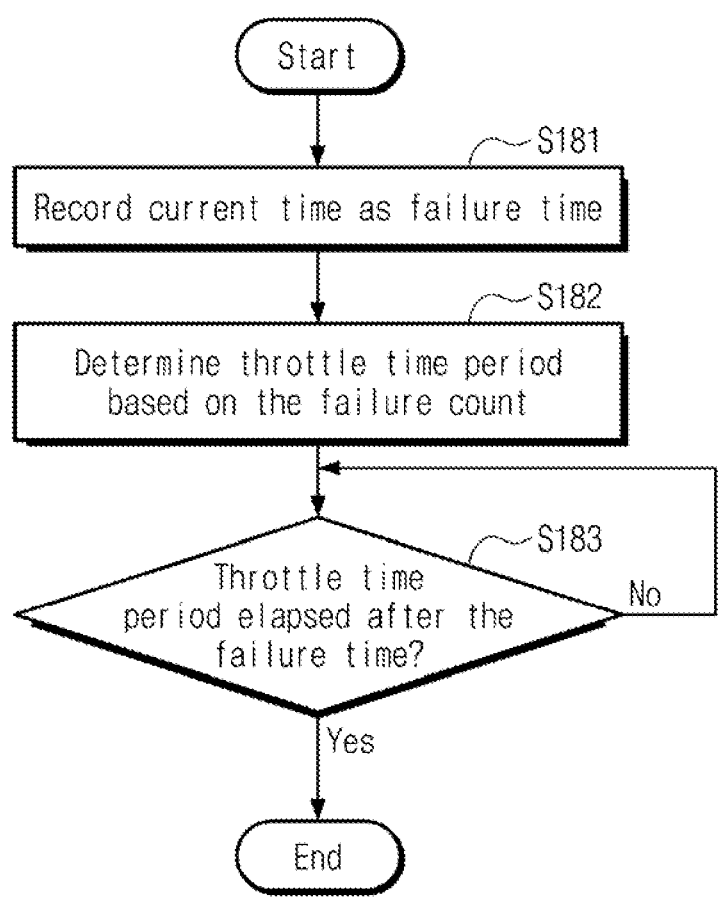
FIG. 6 is a diagram illustrating operation S180 of FIG. 5 in detail.

FIG. 6 is a diagram illustrating operation S180 of FIG. 5 in detail. That is, the operation of the electronic device 10 in the user authentication restriction mode will be described with reference to FIG. 6. Referring to FIGS. 1, 4 to 6, operation S180 may include operation S181 to operation S183.

In operation S181, the electronic device 10 may record a current time point as a failure time point. For example, the security module 111 may record a time point at which the failure count reaches one of threshold values (e.g., "5", "10", "20", "50", and "100" of FIG. 4), as the failure time point. That is, the security module 111 may store the failure time point of the authentication record of the volatile memory 113 as the current time point. Below, for brief description, the time point at which the failure count reaches one of threshold values may be referred to as a "current time point", In operation S182, the electronic device 10 may determine the throttle time period based on the failure count. That is, the electronic device 10 may determine the throttle time period depending on the throttle level corresponding to the failure count (or a threshold value that the failure count reaches). For example, when the failure count is "5", the security module 111 may determine the throttle time period to be 30 seconds. When the failure count is "10", the security module 111 may determine the throttle time period to be 300 seconds.

In operation S183, the electronic device 10 may determine whether the throttle time period elapses from the failure time point. For example, by using the timer 115, the security module 111 may determine whether the throttle time period elapses from the failure time point stored in the volatile memory 113.

In an example embodiment, in operation S183, the electronic device 10 may operate in the user authentication restriction mode until it is determined that the throttle time period elapses. That is, the electronic device 10 may block an authentication attempt from the user 300. For example, the electronic device 10 may not receive the authentication data DATA_auth from the user 300 until it is determined that the throttle time period elapses.

When it is determined in operation S183 that the throttle time period elapses, the electronic device 10 may transition to the lock mode from the user authentication restriction mode under control of the security module 111. In this case, operation S110 may be performed as the authentication data DATA_auth are received from the user 300.

Figure 7A:
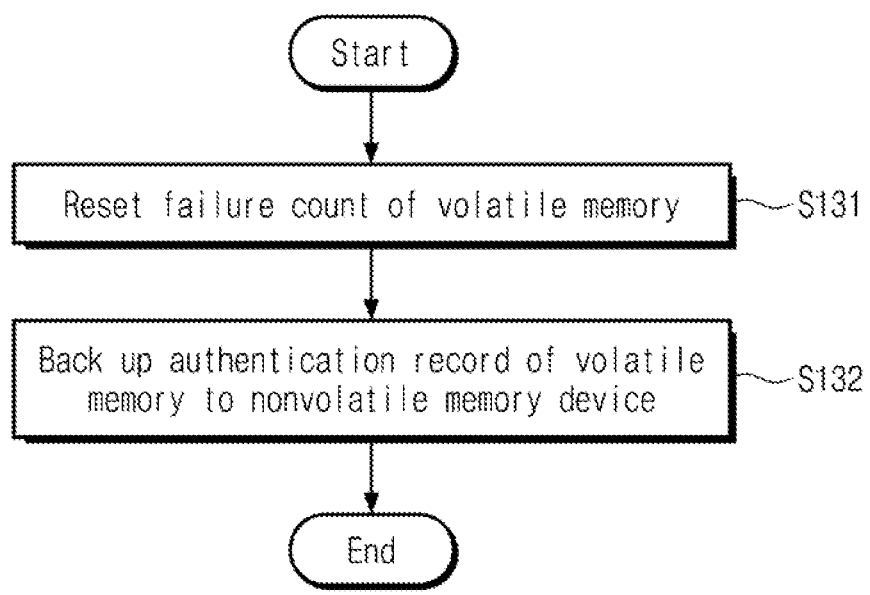
FIGS. 7A and 7B are diagrams illustrating operation S130 of FIG. 5 in detail.
Figure 7B:
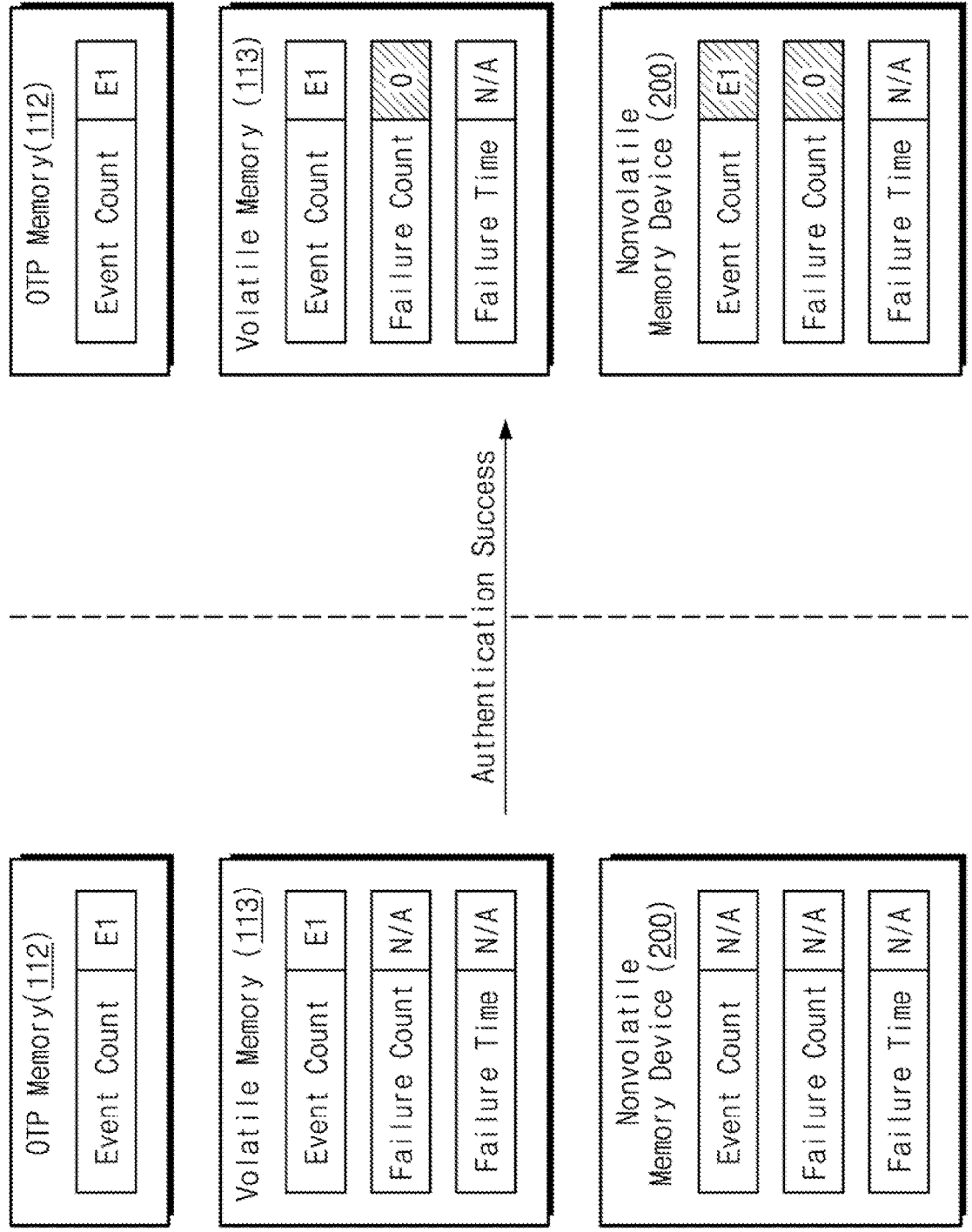

FIGS. 7A and 7B are diagrams illustrating operation S130 of FIG. 5 in detail. That is, the operation of the electronic device 10 when user authentication succeeds will be described with reference to FIGS. 7A and 7B.

First, referring to FIGS. 1, 4, 5, and 7A, operation S130 may include operation S131 and operation S132.

In operation S131, the electronic device 10 may reset the failure count of the volatile memory 113. For example, the security module 111 may set the failure count to "0".

In operation S132, the electronic device 10 may back up the authentication record of the volatile memory 113 to the nonvolatile memory device 200. That is, the security module 111 may update the authentication record (i.e., the backup authentication record) of the nonvolatile memory device 200 so as to be changed to the authentication record of the volatile memory 113. As such, the failure count of the backup authentication record stored in the nonvolatile memory device 200 may be "0". Also, the event count (i.e., the third event count) of the backup authentication record may have the same value as the event count (i.e., the first event count) of the OTP memory 112 and the event count (i.e., the second event count) of the volatile memory 113.

In an example embodiment, the electronic device 10 may encrypt the authentication record of the volatile memory 113 and may back up the encrypted authentication record in the nonvolatile memory device 200. For example, the backup authentication record may be in a state of being encrypted by the encryption module 116. In detail, the authentication record backed up to the nonvolatile memory device 200 may be in a state of being encrypted based on at least one of the event count of the OTP memory 112 and the private key for the secure processor 110.

FIG. 7B is a diagram illustrating a change of data stored in the OTP memory 112, the volatile memory 113, and the nonvolatile memory device 200 when user authentication succeeds. Referring to FIGS. 1, 4, 5, 7A, and 7B, as the user authentication succeeds, the failure count stored in the volatile memory 113 may be reset. For example, as the user authentication succeeds, the failure count present in the volatile memory 113 may be "0".

In an example embodiment, the event count (i.e., the first event count) stored in the OTP memory 112 may not be changed. For example, a value of the first event count may be "E1" before and after the user authentication success.

Meanwhile, the event count (i.e., the second event count) stored in the volatile memory 113 may have the same value as the first event count. That is, the second event count may have the same value (e.g., "E1") as the first event count.

As the user authentication succeeds, the authentication record present in the volatile memory 113 may be backed up to the nonvolatile memory device 200. In this case, the event count (i.e., the third event count) of the backup authentication record may have the same value (e.g., "E1") as the first and second event counts. Also, the failure count of the backup authentication record may be "0".

FIGS. 8A to 8D are diagrams illustrating operation S160 of FIG. 5 in detail. That is, the operation of the electronic device 10 when user authentication fails will be described with reference to FIGS. 8A to 8D.

Referring to FIGS. 1, 4, 5, and 8A, operation S160 may include operation S161 to operation S163.

In operation S161, the electronic device 10 may determine whether the throttle level is changed. For example, the security module 111 may determine whether the throttle level corresponding to the failure count of the volatile memory 113 is changed. That is, when the failure count increases from 0 to 1, or when the failure count increases for the first time after reaching one of threshold values, the security module 111 may determine that the throttle level is changed. In other words, when the user authentication fails for the first time after the failure count is reset, or when the failure count is increased by user authentication failure for the first time after the throttle time period is applied as the failure count reaches a threshold value, the security module 111 may determine that the throttle level is changed.

When it is determined in operation S161 that the throttle level is changed, operation S162 and operation S163 may be performed.

In operation S162, the electronic device 10 may increase the event count of the OTP memory 112. For example, the security module 111 may increase the first event count as much as "1".

That is, as the event count of the OTP memory 112 increases as the failure count reaches the threshold value, the capacity of the OTP memory 112, which is needed to store the event count, may be minimized.

In operation S163, the electronic device 10 may update the event count of the volatile memory 113. For example, the security module 111 may increase the event count (i.e., the second event count) of the volatile memory 113 so as to have the same value as the first event count.

In contrast, when it is determined in operation S161 that the throttle level is not changed, operation S160 may end. In this case, operation S170 of FIG. 5 may be performed.

Figure 8A:
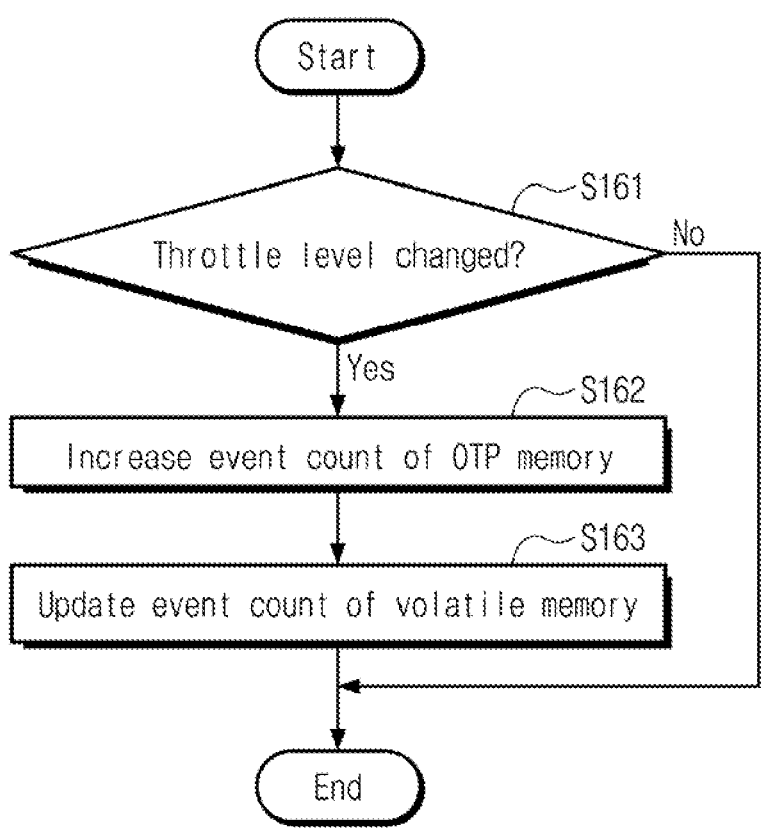
FIGS. 8A to 8D are diagrams illustrating operation S160 of FIG. 5 in detail.
Figure 8B:
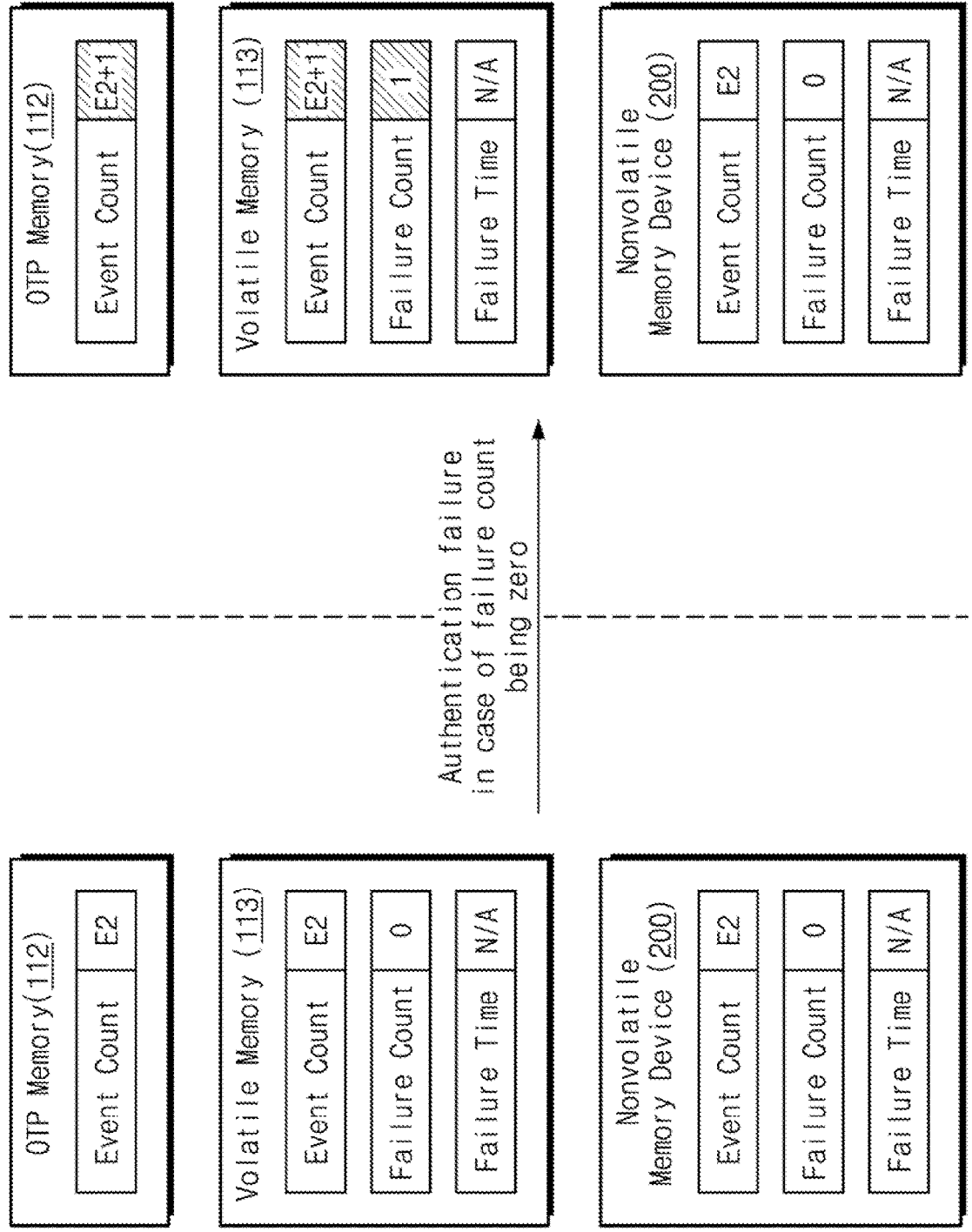

FIG. 8B is a diagram illustrating a change of data stored in the OTP memory 112, the volatile memory 113, and the nonvolatile memory device 200 when user authentication fails in a state where the failure count is "0". Referring to FIGS. 1, 4, 5, 8A, and 8B, as the user authentication fails, the failure count stored in the volatile memory 113 may increase to "1". For example, the failure count of the volatile memory 113 may increase from 0 to 1. In this case, as the user authentication fails in a state where the failure count is "0", the throttle level corresponding to the failure count may be changed. In detail, after the user authentication succeeds (i.e., after the failure count is reset), the throttle level may increase from 0 to 1 as the user authentication fails for the first time.

As the throttle level corresponding to the failure count is changed, the security module 111 may increase the event count of the OTP memory 112. For example, under control of the security module 111, the first event count may increase by "1", that is, from "E2" to "E2+1".

As the first event count increases, the security module 111 may update the event count (i.e., the second event count) of the volatile memory 113. That is, the security module 111 may increase the second event count so as to have the same value as the first event count. For example, under control of the security module 111, the second event count may be updated with "E2+1".

Meanwhile, even though the user authentication fails in a state where the failure count is "0", the backup authentication record stored in the nonvolatile memory device 200 may not be updated.

Figure 8C:
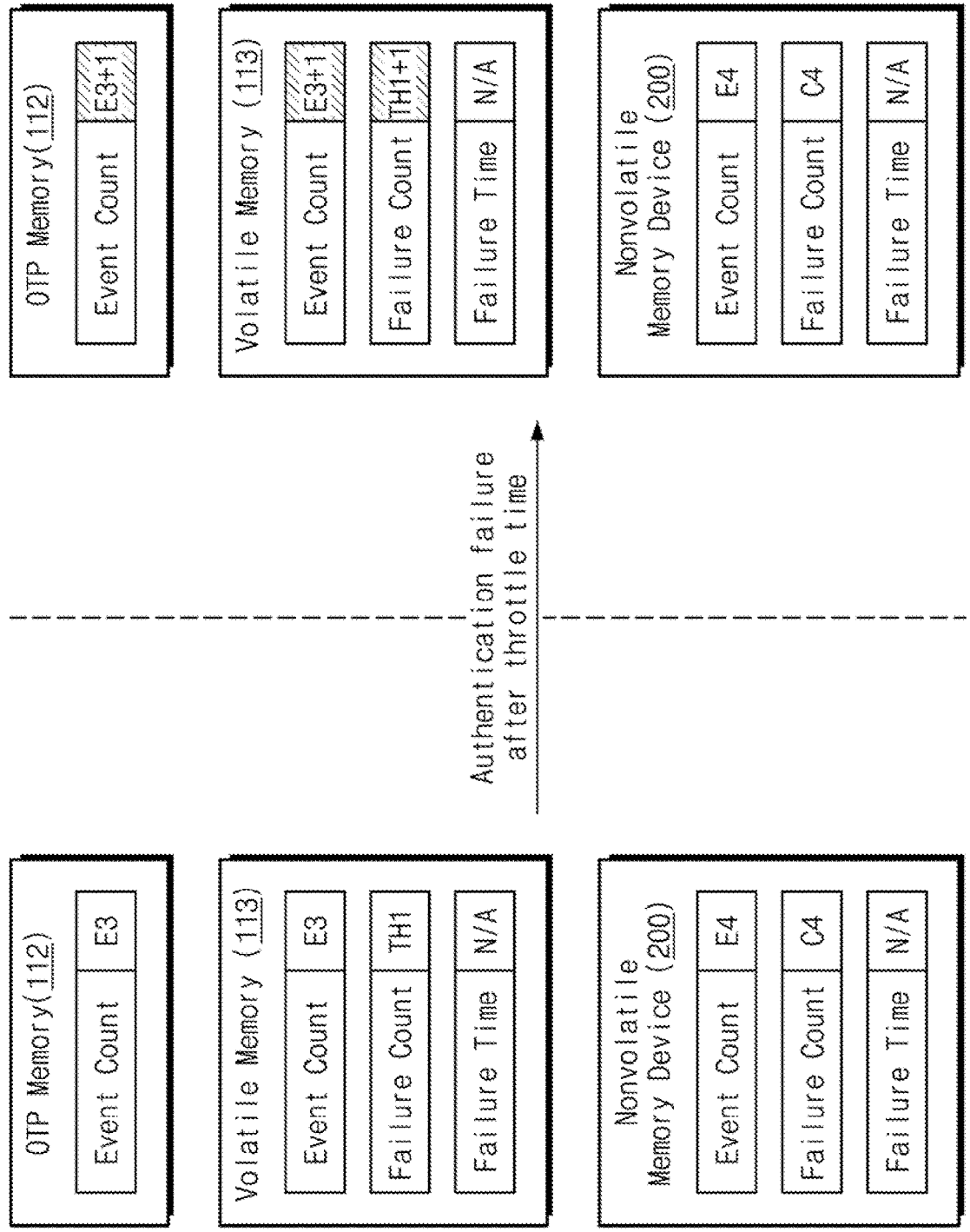

FIG. 8C is a diagram illustrating a change of data stored in the OTP memory 112, the volatile memory 113, and the nonvolatile memory device 200 when user authentication fails for the first time after the throttle time period ends (or elapses). Referring to FIGS. 1, 4, 5, 8A, and 8C, as the user authentication fails for the first time after the throttle time period elapses, the failure count of the volatile memory 113 may increase by "1, that is, from "TH1" to "TH1+1". Below, "TH1" may be referred to as a "first threshold value".

As the failure count increases after the throttle time period applied by the failure count reaches a first threshold value elapses, the throttle level corresponding to the failure count may be changed. For example, the first threshold value (i.e., "TH1") may be an upper limit of a first failure count range, and a value (i.e., "TH1+1") that is greater than the first threshold value as much as "1" may be a lower limit of a second failure count range (as the failure count increases, the failure count range may be changed). Accordingly, when the failure count increases after the throttle time period elapses, the throttle level corresponding to the failure count may increase. In detail, for example, when "TH1" is "5", the throttle level may be "1"; however, because "TH1+1" is "6", the throttle level corresponding to "TH1+1" may be "2".

That is, because the throttle level is changed as the failure count increases, the security module 111 may increase the event count of the OTP memory 112. For example, under control of the security module 111, the first event count may increase by "1", that is, from "E3" to "E3+1". In this case, the second event count may also be updated with "E3+1".

Meanwhile, even though the user authentication fails for the first time after the throttle time period elapses, the backup authentication record stored in the nonvolatile memory device 200 may not be updated.

Figure 8D:
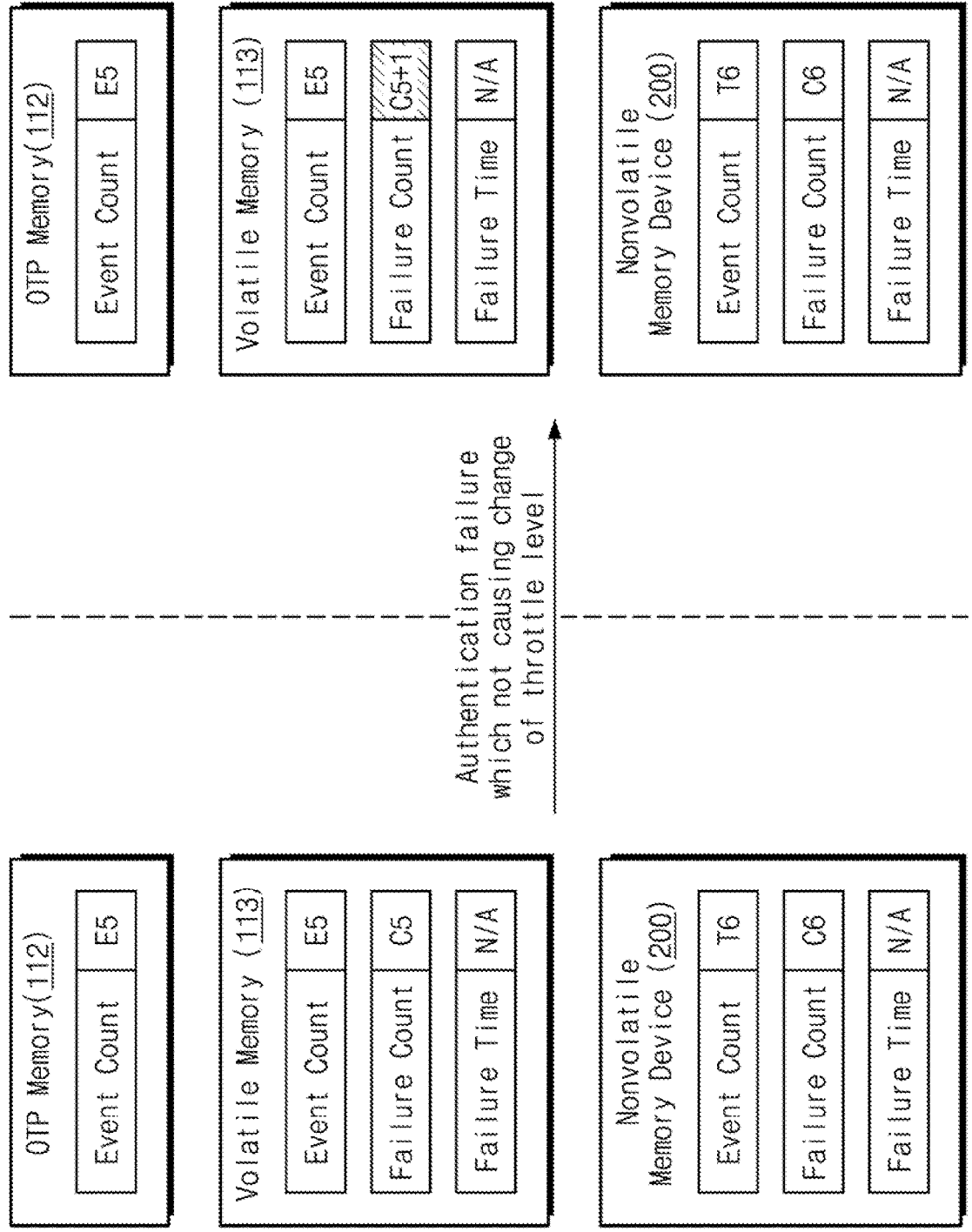

FIG. 8D is a diagram illustrating a change of data stored in the OTP memory 112, the volatile memory 113, and the nonvolatile memory device 200 when the throttle level is not changed even though user authentication fails. Referring to FIGS. 1, 4, 5, 8A, and 8D, the throttle level may not be changed even though the user authentication fails. For example, as the user authentication fails, the failure count of volatile memory 113 may increase by "1", that is, from "C5" to "C5+1". However, in this case, the throttle level corresponding to the failure count may not be changed.

In detail, "C5" and "C5+1" may be included in the same failure count range. For example, when "C5" is "13", "C5+1" may be "14". In this case, both "C5" and "C5+1" may be included in the third failure count range, that is, may correspond to throttle level 3.

In an example embodiment, when the failure count increases and reaches the threshold value, the failure time point may be set to the "current time point". For example, when "C5+1" reaches the threshold value, the electronic device 10 may operate in the user authentication restriction mode during a time corresponding to "C5+1" from the "current time point". The operation of the electronic device 10 when the failure count increases and reaches the threshold value is described with reference to FIG. 6, and thus, additional description will be omitted to avoid redundancy.

Meanwhile, the event counts (i.e., the first and second event counts) of the OTP memory 112 and the volatile memory 113 may not be updated. Also, the backup authentication record of the nonvolatile memory device 200 may not be updated.

Figure 9A:
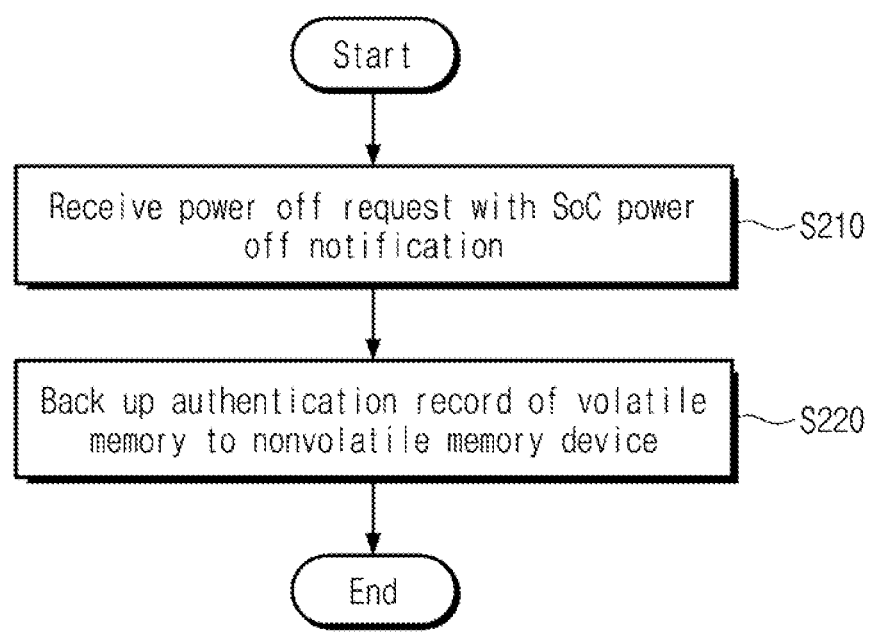
FIGS. 9A and 9B are diagrams illustrating an operation of a secure processor when an electronic device is normally powered off.
Figure 9B:
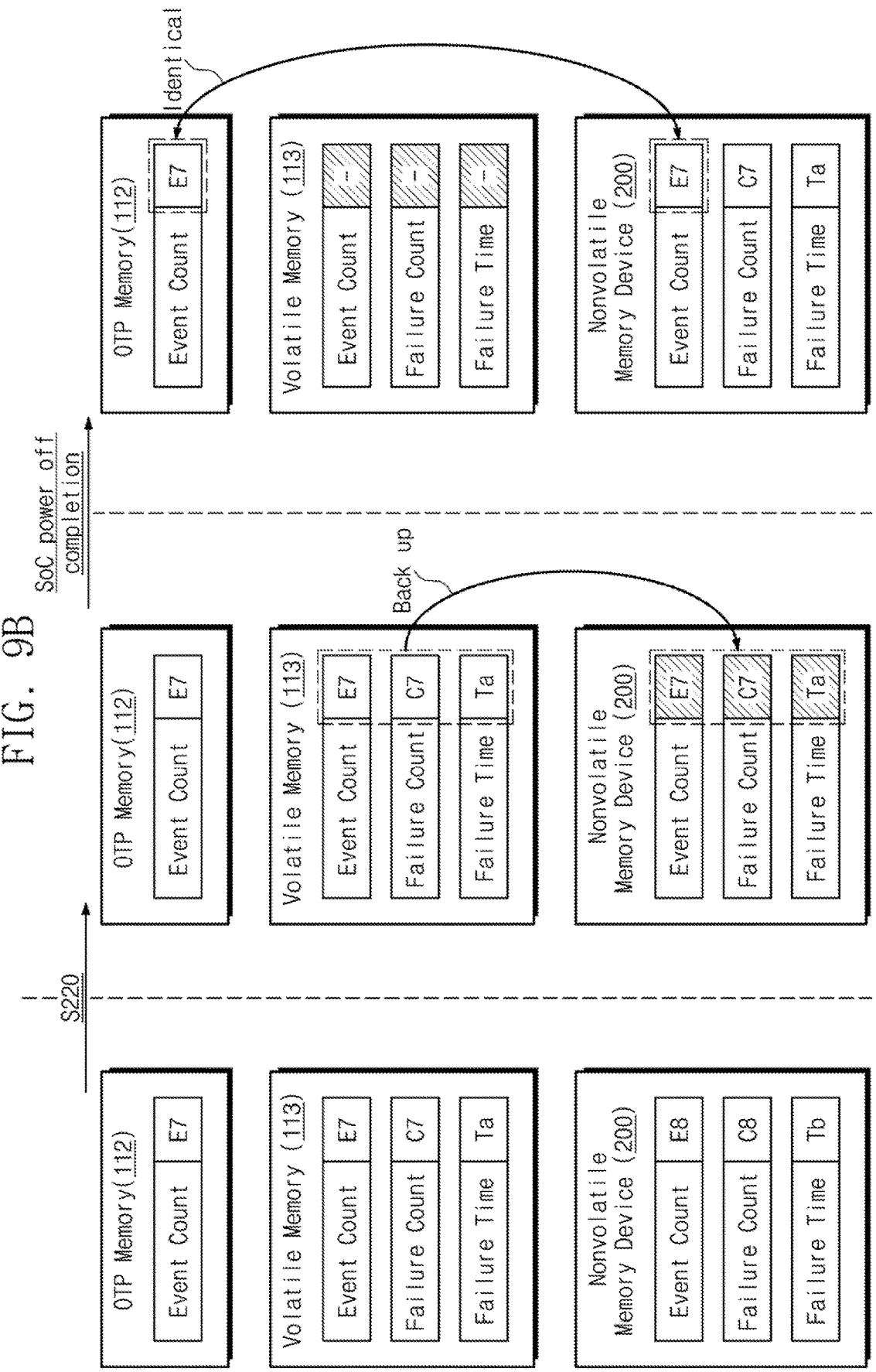

FIGS. 9A and 9B are diagrams illustrating an operation of a secure processor when an electronic device is normally powered off. That is, an operation that the secure processor 110 performs as the electronic device 10 (or the system on chip 100) is powered off will be described with reference to FIGS. 9A and 9B.

Referring to FIGS. 1, 5, and 9A, in operation S210, the secure processor 110 may receive, from the system on chip 100, the power-off request together with the notification indicating that the system on chip 100 is scheduled for power-off. For example, a system end request of the electronic device 10 may be issued by the user 300, or the system end request of the electronic device 10 may be issued from an application program or an operating system executable in the electronic device 10. In this case, the system on chip 100 may provide the secure processor 110 with the notification indicating that the system on chip 100 is scheduled for power-off and the power-off request.

In operation S220, the secure processor 110 may back up the authentication record of the volatile memory 113 up to the nonvolatile memory device 200. For example, the security module 111 may update the backup authentication record of the nonvolatile memory device 200 by using the authentication record of the volatile memory 113. In this case, the backup authentication record may be identical to the authentication record of the volatile memory 113.

Afterwards, when the power-off procedure of the system on chip 100 is completed, the power that is provided to the volatile memory 113 may be blocked. As such, the authentication data stored in the volatile memory 113 may be lost.

In an example embodiment, operation S210 and operation S220 described above may be performed only when the system on chip 100 (or the electronic device 10) is normally powered off. For example, when the SPO event occurs in the electronic device 10 due to forcible power-off or battery disconnection, operation S210 and operation S220 described above may not be performed. In this case, the volatile memory 113 may be powered off in a state where the authentication record of the volatile memory 113 is not backed up to the nonvolatile memory device 200. As such, there may be a difference between the case that the system on chip 100 is normally powered off and the case where the system on chip 100 is powered off due to the SPO. Accordingly, whether the SPO event occurs may be determined while the secure processor 110 is being powered on for the first time after the system on chip 100 is powered on. How to determine whether the SPO event occurs will be described in detail with reference to FIGS. 10 and 11.

FIG. 9B is a diagram illustrating a change of data stored in the OTP memory 112, the volatile memory 113, and the nonvolatile memory device 200 when the system on chip 100 (or the electronic device 10) is normally powered off.

Referring to FIGS. 1, 5, 9A, and 9B, as operation S220 described with reference to FIG. 9A is performed, the authentication record of the volatile memory 113 may be backed up to the nonvolatile memory device 200. For example, the backup authentication record of the nonvolatile memory device 200 may be updated to be identical to the authentication record of the volatile memory 113.

That is, when the system on chip 100 is normally powered off, the event count, the failure count, and the failure time point present in the volatile memory 113 may be backed up to the nonvolatile memory device 200. For example, before operation S220 is performed (i.e., before the secure processor 110 receives the power-off request from the system on chip 100), the event count, the failure count, and the failure time point present in the volatile memory 113 may be "E7", "C7", and "Ta", respectively. As operation S220 is performed, the event count of the nonvolatile memory device 200 may be changed from "E8" to "E7", the failure count thereof may be changed from "C8" to "C7", and the failure time point thereof may be changed from "Tb" to "Ta".

Afterwards, as the power-off procedure of the system on chip 100 is completed, the power that is provided to the volatile memory 113 may be blocked. In this case, the authentication data stored in the volatile memory 113 may be lost. However, before the power of the volatile memory 113 is blocked, the event count of the volatile memory 113 may be updated depending on the event count of the OTP memory 112, and the event count of the volatile memory 113 may be backed up to the nonvolatile memory device 200; in this case, the event count stored in the nonvolatile memory device 200 may be identical to the event count of the OTP memory 112. That is, when the system on chip 100 is normally powered off, the first event count and the third event count may have the same value.

Figure 10:
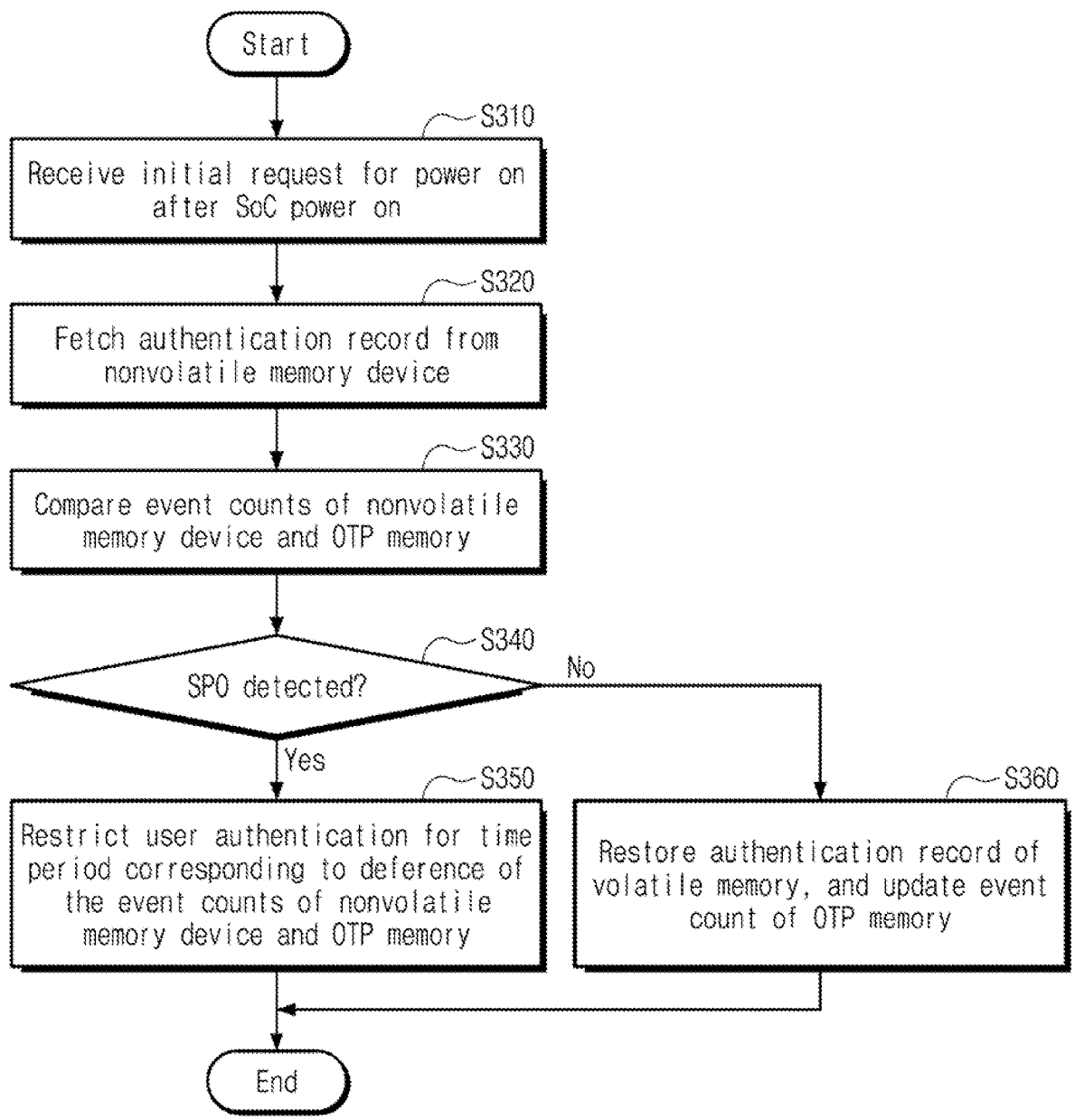

FIG. 10 is a flowchart illustrating an operation of a secure processor when an electronic device is normally powered on. Referring to FIGS. 1, 9A, 9B, and 10, in operation S310, the secure processor 110 may receive the power-on request from the system on chip 100 for the first time after the system on chip 100 is powered on.

In operation S320, the secure processor 110 may fetch the authentication record from the nonvolatile memory device (NVM) 200. For example, the security module 111 may fetch the backup authentication record stored in the nonvolatile memory device 200. In an example embodiment, the fetched backup authentication record may be stored in the volatile memory 113.

In an example embodiment, a plurality of backup authentication records may be stored in the nonvolatile memory device 200. For example, authentication records including authentication records not erased after backup and backup authentication records stored for the purpose of the security attack from the outside may be stored in the nonvolatile memory device 200. In this case, through the encryption module 116, the security module 111 may identify the latest authentication record among the authentication records stored in the nonvolatile memory device 200. In detail, through the encryption module 116, the security module 111 may identify the latest authentication record, based on whether each of the plurality of authentication records is encrypted based on any event count value (e.g., a value of the first event count). For example, the security module 111 may determine that the authentication record encrypted based on the first event count value of "2" is stored to be relatively recently compared to the authentication record encrypted based on the first event count value of "1". The security module 111 may fetch the authentication record, which is identified in the above manner, from the nonvolatile memory device 200.

In an example embodiment, the security module 111 may check the integrity of the authentication record (i.e., the backup authentication record) fetched from the nonvolatile memory device 200. That is, between operation S320 and operation S330, the security module 111 may check whether the falsification (e.g., a rollback of a failure count and/or a failure time point) is made in the authentication record stored in the nonvolatile memory device 200, through the encryption module 116. When it is determined that the falsification is made in the authentication record stored in the nonvolatile memory device 200 or when the backup authentication record is deleted, the security module 111 may determine that the user authentication is impossible.

In an example embodiment, the security module 111 may determine whether the authentication record (i.e., the backup authentication record) fetched from the nonvolatile memory device 200 is stored by the secure processor 110. That is, between operation S320 and operation S330, the security module 111 may determine whether the fetched backup authentication record is encrypted based on the private key for the secure processor 110, through the encryption module 116 of the secure processor. For example, the security module 111 may determine whether or not the backup authentication record present in the nonvolatile memory device 200 was generated by the security attack from the outside. For example, the security module 111 may determine whether the backup authentication record present in the nonvolatile memory device 200 is generated for the purpose of the security attack from the outside. When it is determined that the backup authentication record present in the nonvolatile memory device 200 was not generated using the secure processor 110, the security module 111 may determine that the user authentication is impossible. Also, when it is determined that the backup authentication record is not present in the nonvolatile memory device 200, the security module 111 may determine that the user authentication is impossible.

In an example embodiment, when it is determined by the security module 111 that the user authentication is impossible, to prevent the leakage of data in the electronic device 10, the security module 111 may format the nonvolatile memory device 200. However, the disclosure is not limited thereto.

In operation S330, the secure processor 110 may compare the event count of the nonvolatile memory device 200 and the event count of the OTP memory 112. For example, the security module 111 may determine whether the first event count and the third event count have the same value.

In operation S340, the secure processor 110 may determine whether the SPO event occurs. For example, when the first event count and the third event count have the same value, the security module 111 may determine that the SPO event does not occur (i.e., the system on chip 100 is normally powered off). That is, when the first event count and the third event count have the same value, the occurrence of the SPO event may not be detected. In contrast, when the first event count and the third event count have different values, the security module 111 may determine that the SPO event occurs (i.e., the system on chip 100 is abnormally powered off). That is, when the first event count and the third event count have different values, the occurrence of the SPO event may be detected. When the occurrence of the SPO event is detected, operation S350 may be performed; when the occurrence of the SPO event is not detected, operation S360 may be performed.

In operation S350, the secure processor 110 may restrict the user authentication during a time corresponding to the difference between the event count of the nonvolatile memory device 200 and the event count of the OTP memory 112. For example, the security module 111 may determine a throttle time period based on the difference between the first and third event counts. How the secure processor 110 restricts the user authentication in response to that the occurrence of the SPO event is detected will be described in detail with reference to FIGS. 13A and 13B.

In operation S360, the secure processor 110 may restore the authentication record of the volatile memory 113 and may update the event count of the OTP memory 112. For example, the security module 111 may restore the authentication record of the volatile memory 113 based on the backup authentication record stored in the nonvolatile memory device 200. The security module 111 may increase the event count of the OTP memory 112 and the event count of the volatile memory 113 based on the failure count of the backup authentication record. How the secure processor 110 restores the authentication record of the volatile memory 113 and updates the event count of the OTP memory 112 in response to that the occurrence of the SPO event is not detected will be described in detail with reference to FIGS. 12A and 12B.

FIG. 11 is a diagram for describing operation S340 of FIG. 10. Referring to FIGS. 1, 9A, 9B, 10, and 11, when the system on chip 100 and the secure processor 110 are powered on after the system on chip 100 is normally powered off, the backup authentication record of the nonvolatile memory device 200 may be identical to the authentication record of the volatile memory 113 immediately before the secure processor 110 is powered off. Accordingly, the event count of the OTP memory 112 and the event count of the nonvolatile memory device 200 may have identical values. For example, the first and third event counts may identically have a value of "E7".

In contrast, when the system on chip 100 and the secure processor 110 are powered on after the system on chip 100 is powered off by the SPO, the backup authentication record of the nonvolatile memory device 200 may be different from the authentication record of the volatile memory 113 immediately before the secure processor 110 is powered off. That is, the event count of the OTP memory 112 and the event count of the nonvolatile memory device 200 may have different values. For example, the first event counts may be "E7", and the second event count may be "E8".

Accordingly, the security module 111 may determine whether the system on chip 100 is powered off by the occurrence of the SPO event, by comparing the event count of the OTP memory 112 and the event count of the nonvolatile memory device 200.

Figure 12A:
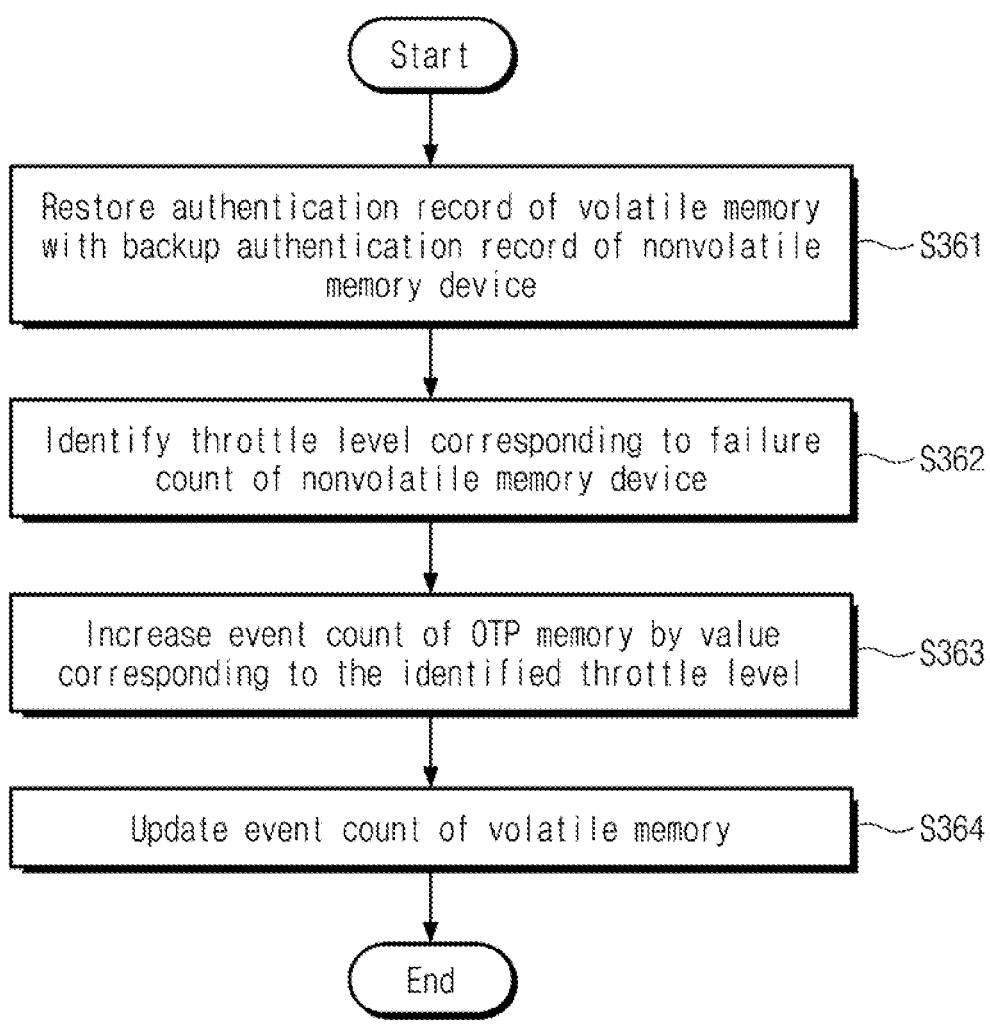

FIGS. 12A and 12B are diagrams illustrating operation S360 of FIG. 10 in detail. The operation of the secure processor 110 when the SPO event is not detected while the secure processor 110 is powered on for the first time after the system on chip 100 is powered on will be described with reference to FIGS. 12A and 12B.

First, referring to FIGS. 1, 9A, 9B, 10, and 12A, operation S360 may include operation S361 to operation S364.

In operation S361, the secure processor 110 may restore the authentication record of the volatile memory 113 with the backup authentication record stored in the nonvolatile memory device (NVM) 200. For example, the security module 111 may set the failure count of the volatile memory 113 to be identical to the failure count of the nonvolatile memory device 200. The security module 111 may set the failure time point of the volatile memory 113 to be identical to the failure time point of the nonvolatile memory device 200.

In an example embodiment, in the case where the electronic device 10 operates in the user authentication restriction mode before the system on chip 100 (or the electronic device 10) is powered off, the user 300 may not be subject to an additional penalty (e.g., a throttle time period). For example, when the failure count stored in the volatile memory 113 before the system on chip 100 is powered off and the failure time point is 15:30 (pm 3:30), a time point at which the electronic device 10 enters the lock mode from the user authentication restriction mode may be 15:35 (pm 3:35). In this case, as the security module 111 completely restores the authentication record backed up to the nonvolatile memory device 200, the user 300 may attempt the user authentication from 15:35 (pm 3:35).

In operation S362, the secure processor 110 may identify the throttle level corresponding to the failure count of the nonvolatile memory device 200. For example, when the failure count stored in the nonvolatile memory device 200 (or the restored failure count of the volatile memory 113) is "8", the security module 111 may determine that the throttle level is "2".

In operation S363, the secure processor 110 may increase the event count of the OTP memory 112 as much as a value corresponding to the identified throttle level. For example, when the throttle level is identified to be "2" by the security module 111 in operation S362, the security module 111 may increase the first event count as much as "2".

In an example embodiment, as the security module 111 increases the first event count as much as a value corresponding to the throttle level in operation S363, the difference between the first event count and the third event count may correspond to the throttle level. For example, a value that is obtained by subtracting a value of the third event count from a value of the first event count may be identical to the value of the throttle level corresponding to the failure count stored in the volatile memory 113.

In operation S364, the secure processor 110 may update the event count of the volatile memory 113. For example, the security module 111 may increase the event count (i.e., the second event count) of the volatile memory 113 so as to have the same value as the first event count.

FIG. 12B is a diagram illustrating a change of data stored in the OTP memory 112, the volatile memory 113, and the nonvolatile memory device 200 when the occurrence of the SPO event is not detected while the secure processor 110 is powered on for the first time after the system on chip 100 is powered on.

Referring to FIGS. 1, 9A, 9B, 10, 12A, and 12B, as operation S360 of FIG. 10 is performed, the authentication record of the volatile memory 113 may be restored, and the event count of the OTP memory 112 may be updated.

The failure count and the failure time point of the volatile memory 113 may be restored to be identical to the failure count and the failure time point backed up to the nonvolatile memory device 200. For example, the failure count of the volatile memory 113 may be restored to "C7", and the failure time point of the volatile memory 113 may be restored to "Ta".

Under control of the security module 111, the event count of the OTP memory 112 may increase as much as "R1". That is, the first event count may increase from "E7" to "E7+R1". For example, "R1" may indicate a value of the throttle level corresponding to the restored failure count of "C7". In detail, for example, when "C7" is "7", the throttle level corresponding to "C7" may be "2", and thus, "R1" may be "2".

Also, as the event count of the OTP memory 112 increases, the event count of the volatile memory 113 may increase. That is, the second event count may be updated to have the same value as the first event count. For example, the second event count may be updated to "E7+R1".

Meanwhile, even though operation S360 is performed, the backup authentication record present in the nonvolatile memory device 200 may not be changed.

Figure 13A:
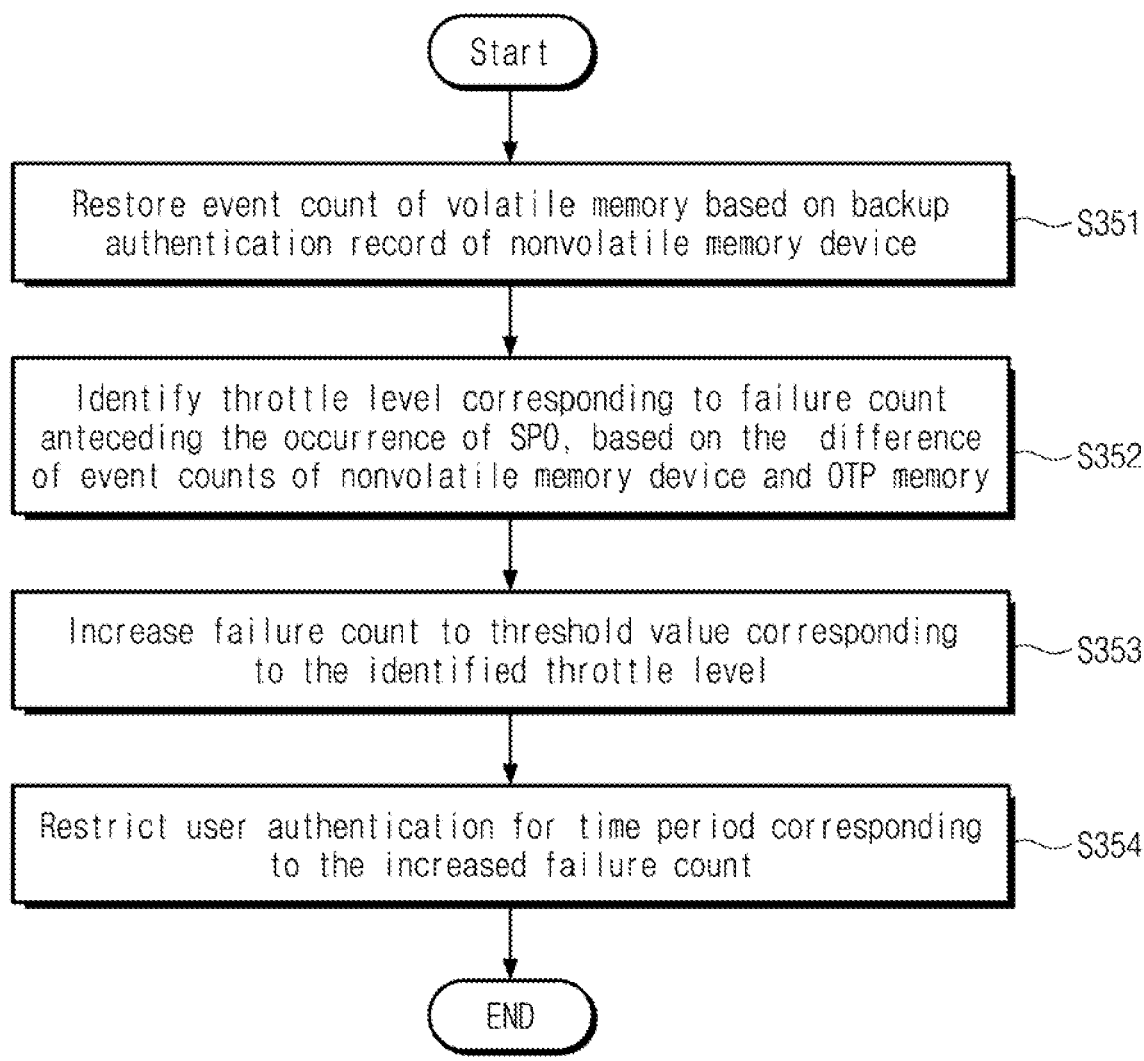
FIGS. 13A and 13B are diagrams illustrating operation S350 of FIG. 10 in detail.
Figure 13B:
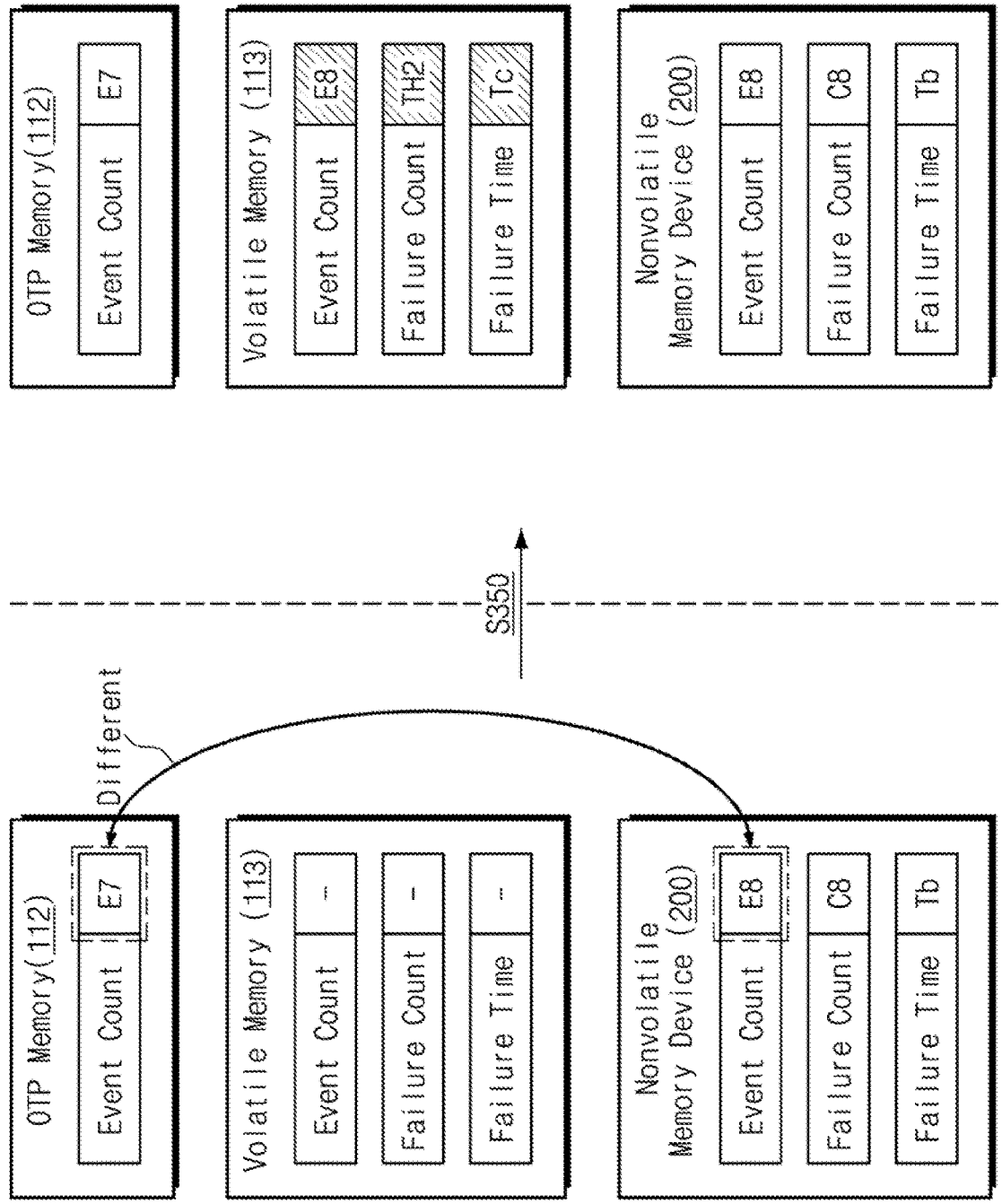

FIGS. 13A and 13B are diagrams illustrating operation S350 of FIG. 10 in detail. The operation of the secure processor 110 when the SPO event is detected while the secure processor 110 is powered on for the first time after the system on chip 100 is powered on will be described with reference to FIGS. 13A and 13B.

First, referring to FIGS. 1, 9A, 9B, 10, and 13A, operation S350 may include operation S351 to operation S354.

In operation S351, the secure processor 110 may restore the authentication record of the volatile memory 113 based on the backup authentication record stored in the nonvolatile memory device 200.

In operation S352, the secure processor 110 may identify the throttle level corresponding to the failure count anteceding the occurrence of the SPO event, based on a difference between the event counts stored in the OTP memory 112 and the nonvolatile memory device 200 (or a difference between the event count of the OTP memory 112 and the restored event count of the volatile memory 113). For example, when the secure processor 110 operates in the power-on state, the security module 111 may control the first and third event counts (e.g., through operation S130 and operation S160 of FIG. 5) such that the difference between the first and third event counts corresponds to the throttle level associated with the failure count. Accordingly, the security module 111 may determine that the difference between the first event count and the third event count corresponds to the throttle level anteceding (i.e., before) the occurrence of the SPO event.

For example, when the difference between the first event count and the third event count is "3", the security module 111 may determine that the throttle level corresponding to the failure count before the occurrence of the SPO event is "3". In other words, the security module 111 may determine that the failure count before the occurrence of the SPO event is included in the failure count range from 11 to 20.

In operation S353, the secure processor 110 may increase the failure count of the volatile memory 113 to the threshold value corresponding to the identified throttle level. For example, when it is determined that the throttle level is "3", the security module 111 may increase the failure count to "20" (i.e., the upper limit of the failure count range from 11 to 20).

That is, the failure count is increased to the upper limit of the failure count range in which the failure count before the occurrence of the SPO event is included. For example, even though it is determined that the failure count range in which the failure count before the occurrence of the SPO event is included is from 11 to 20, the failure count may be increased to "20". Accordingly, even when the SPO event occurs, the failure count stored in the volatile memory 113 may not be initialized. Accordingly, the security of the electronic device 10 may be improved.

Afterwards, in operation S354, the secure processor 110 may restrict the user authentication during a time corresponding to the failure count, based on the increased failure count value. Operation S353 may be substantially identical to operation S180 described with reference to FIGS. 5 and 6. For example, in operation S354, the failure time point of the volatile memory 113 may be set to a time point at which the occurrence of the SOP event is detected (or a time point at which the failure count increases to the threshold value).

FIG. 13B is a diagram illustrating a change of data stored in the OTP memory 112, the volatile memory 113, and the nonvolatile memory device 200 when the occurrence of the SPO event is detected while the secure processor 110 is powered on for the first time after the system on chip 100 is powered on.

Referring to FIGS. 1, 9A, 9B, 10, 13A, and 13B, as operation S350 of FIG. 10 is performed, the authentication record of the volatile memory 113 may be restored.

The event count of the volatile memory 113 may be restored to the event count stored in the nonvolatile memory device 200. For example, the second event count may be restored to "E8".

The failure count of the volatile memory 113 may increase to the threshold value corresponding to a difference between the event counts stored in the OTP memory 112 and the nonvolatile memory device 200 (or a difference between the event count of the OTP memory 112 and the restored event count of the volatile memory 113). For example, the security module 111 may identify the throttle level corresponding to "E7-E8" being the difference between the event counts stored in the OTP memory 112 and the nonvolatile memory device 200. The security module 111 may increase the failure count of the volatile memory 113 to "TH2" being the threshold value corresponding to the identified throttle level (i.e., the upper limit of the throttle level range corresponding to the identified throttle level).

The failure time point of the volatile memory 113 may be set to a time point at which the occurrence of the SOP event is detected (or a time point at which the failure count increases to the threshold value). For example, the failure time point of the volatile memory 113 may be set to "Tc".

Meanwhile, even though operation S350 is performed, the backup authentication record present in the nonvolatile memory device 200 may not be updated.

In an example embodiment, when the occurrence of the SPO event is detected, the failure count may increase to the threshold value; in this case, even when the SPO event occurs, it may be impossible to avoid the situation where the electronic device 10 enters the user authentication restriction mode. Accordingly, according to an example embodiment of the disclosure, the security of the electronic device 10 may be improved.

Figure 14:
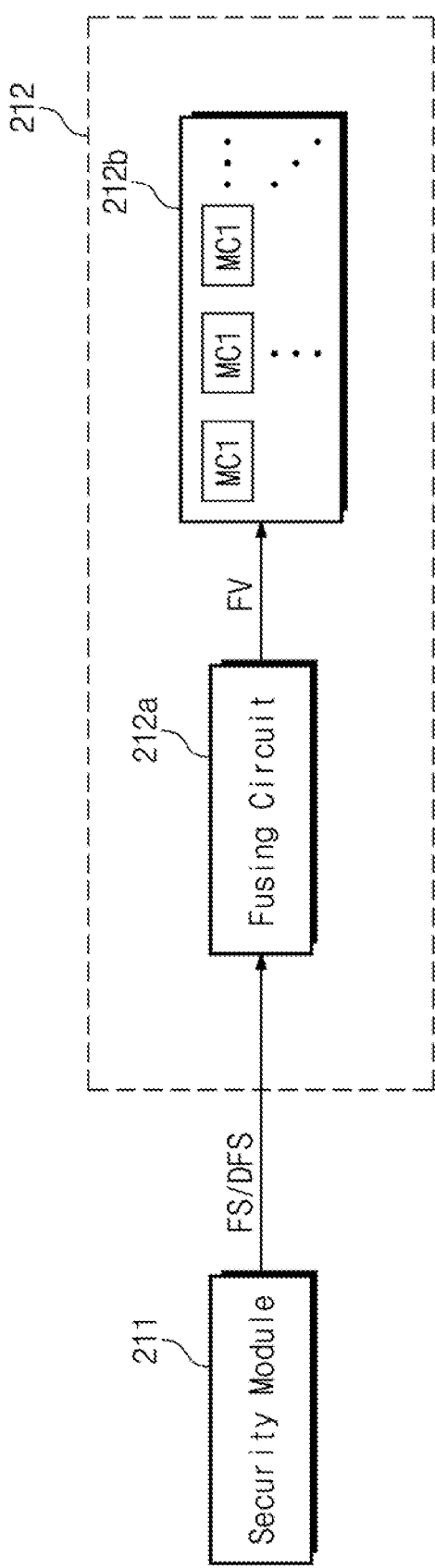
FIG. 14 is a diagram illustrating operations of a security module and an one-time programmable (OTP) memory according to an example embodiment of the disclosure.

FIG. 14 is a diagram illustrating operations of a security module and an OTP memory according to an example embodiment of the disclosure. Referring to FIG. 14, a security module 211 may provide an OTP memory 212 with a fusing signal FS or a dummy fusing signal DFS. Functions of the security module 211 and the OTP memory 212 may respectively be identical to the functions of the security module 111 and the OTP memory 112 described with reference to FIGS. 1 to 13B. Thus, additional description associated with the functions of the security module 211 and the OTP memory 212 will be omitted to avoid redundancy.

The OTP memory 212 may include a fusing circuit 212a and a memory cell array 212b. The memory cell array 212b may include a plurality of memory cells MC.

Each of the plurality of memory cells MC may store data in the form of electrical fuse. For example, each of the plurality of memory cells MC may include an electrical fuse. The electrical fuse may be cut off in response to the overcurrent. Below, a memory cell including an electrical fuse cut off by the overcurrent is referred to as a "fused memory cell". In contrast, a memory cell including an electrical fuse not cut off is referred to as an "un-fused memory cell".

Each of the plurality of memory cells MC may have one of a fused state or an un-fused state. Each of the plurality of memory cells MC may store 1-bit data based on state information.

In an example embodiment, the OTP memory 212 may store the event count. In this case, a value of the event count may correspond to the number of memory cells fused from among memory cells included in the OTP memory 212.

In an example embodiment, because each of the plurality of memory cells MC stores data in the form of electrical fuse, a fused memory cell (e.g., the first memory cell MC1) among the plurality of memory cells MC may be incapable of transitioning to the un-fused state. That is, each of the plurality of memory cells MC of the OTP memory 212 may not be able to be reprogrammed. Also, the data stored in each of the plurality of memory cells MC may be maintained even though the power is not supplied to the OTP memory 212. However, the disclosure is not limited to the above way to implement the plurality of memory cells MC. For example, each of the plurality of memory cells MC of the OTP memory 212 may store data in the form of anti-fuse.

The fusing circuit 212a may provide the memory cell array 212b with a fusing voltage FV. For example, the fusing circuit 212a may sequentially provide the fusing voltage FV to the plurality of memory cells MC. Below, for brief description, it is assumed that the first memory cell MC1 is in the fused state and the second and third memory cells MC2 and MC3 are in the un-fused state. However, the disclosure is not limited thereto.

Under control of the security module 211, the fusing circuit 212a may provide the fusing voltage FV to one (e.g., the second memory cell MC2) of the plurality of memory cells MC. For example, the security module 211 may provide the fusing signal FS to the fusing circuit 212a for the purpose of increasing the event count of the OTP memory 212. In this case, the fusing circuit 212a may provide the fusing voltage FV to the second memory cell MC2 in response to the fusing signal FS.

In an example embodiment, whether the event count of the OTP memory 212 is increased may be determined based on whether the user authentication succeeds. For example, the event count of the OTP memory 212 may increase through operation S160 of FIG. 5 and operation S360 of FIG. 10. However, the event count of the OTP memory 212 may not increase except for operation S160 and operation S360 described above. For example, the event count of the OTP memory 212 may not increase when the user authentication succeeds.

In an example embodiment, when the OTP memory 212 and the Security module 211 communicate with each other through a signal line or a pin physically exposed to the outside, data that are transferred between the OTP memory 212 and the security module 211 may be probed. In this case, the electronic device 10 may be exposed to the security attack through the timing analysis associated with the data transfer timing. For example, the security attacker may avoid the situation where the electronic device 10 enters the user authentication restriction mode, through the occurrence of the SPO event before a memory cell is completely fused upon failing in the user authentication.

To prevent the security attack, the security module 211 may provide the dummy fusing signal DFS to the fusing circuit 212a. For example, when the event count of the OTP memory 212 does not increase (i.e., when the user authentication succeeds or when the user authentication fails but the event count of the OTP memory 212 does not increase), the security module 211 may provide the dummy fusing signal DFS to the fusing circuit 212a.

Even though the fusing circuit 212a provides the fusing voltage FV to the memory cell array 212b in response to the dummy fusing signal DFS, the plurality of memory cells MC may not be fused. For example, the fusing circuit 212a may provide the fusing voltage FV to the first memory cell MC1 that is already fused. Alternatively, the fusing circuit 212a may fuse a spare memory cell of the memory cell array 212b. In this case, the spare memory cell may refer to a memory cell that is not associated with a value of the event count (or a memory cell that is fused depending on the dummy fusing signal DFS).

That is, the security module 211 may provide the dummy fusing signal DFS at the same timing as the fusing signal FS. Also, both when the fusing signal FS is received and when the dummy fusing signal DFS is received, the fusing circuit 212a may provide the fusing voltage FV of the same magnitude to the memory cell array 212b.

In this case, even though data transferred between the OTP memory 212 and the security module 211 are probed or even though power consumption of the OTP memory 212 is probed, it may be difficult to perform the timing analysis based on whether the event count of the OTP memory 212 increases. Accordingly, according to an example embodiment of the disclosure, the security of the electronic device 10 may be improved.

According to an example embodiment of the disclosure, a secure processor that is protected from brute-force user authentication attempts even when a sudden power-off (SPO) event occurs, and an electronic device including the same may be provided. In particular, according to an example embodiment of the disclosure, the capacity of a one-time programmable (OTP) memory included in the secure processor may be minimized.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A electronic device comprising:
  a system on chip (SoC) comprising a secure processor configured to perform user authentication based on authentication data received from a user; and
  a nonvolatile memory device configured to store a first event count,
  wherein the secure processor comprises:
    a volatile memory configured to store a failure count, which increases based on a failure of the user authentication and resets based on a success of the user authentication;
    a security module configured to restrict the user authentication during a first time period when the failure count reaches a first threshold value among a plurality of threshold values; and a one-time programmable (OTP) memory configured to store a second event count, which increases when a throttle level corresponding to the failure count is changed, wherein, when a power-off request for the SoC being generated and when the user authentication being successful, the first event count is updated based on the second event count, and wherein, based on the secure processor being powered on after the SoC is powered on, the security module is further configured to compare the first event count and the second event count to determine whether a sudden power-off (SPO) event occurred.

2. The electronic device of claim 1, wherein the throttle level corresponding to the failure count is changed based on increasing of the failure count for a first time after the success of the user authentication or based on increasing of the failure count for a first time after the failure count reached one of the plurality of threshold values.

3. The electronic device of claim 1, wherein, based on the failure count reaching a second threshold value greater than the first threshold value from among the plurality of threshold values, the security module is further configured to:

restrict the user authentication during a second time period longer than the first time period.

4. The electronic device of claim 1, wherein, based on the determination that the SPO event occurred, the security module is further configured to:

restrict the user authentication with during a third time period based on a difference between the first event count and the second event count.

5. The electronic device of claim 4, wherein, based on the determination that the SPO event occurred, the security module is further configured to:

identify, based on the difference, a first throttle level among a plurality of throttle levels which are respectively corresponding to the plurality of threshold values; and increase the failure count to a third threshold value corresponding to the first throttle level.

6. The electronic device of claim 1, wherein the security module is further configured to:

when the power-off request for the system on chip is generated, back up the failure count stored in the volatile memory to the nonvolatile memory device; and when the SPO event is not detected, increase the first event count based on the failure count backed up in the nonvolatile memory device.

7. The electronic device of claim 6, wherein the failure count stored in the volatile memory is backed up to the nonvolatile memory device after being encrypted based on the second event count.

8. The electronic device of claim 1, wherein the first event count is stored in the nonvolatile memory device after being encrypted.

9. The electronic device of claim 1, wherein the security module is further configured to:

perform the user authentication by determining whether a first passcode generated based on the authentication data corresponds to a second passcode stored in the nonvolatile memory device.

10. The electronic device of claim 1, wherein the OTP memory comprises a plurality of memory cells configured to operate in an electrical fuse manner, wherein the second event count corresponds to a number of fused memory cells among the plurality of memory cells, and wherein, based on a change in the throttle level corresponding to the failure count, the security module is further configured to provide a fusing signal to the OTP memory.

11. The electronic device of claim 10, wherein, based on the success of the user authentication, the security module is further configured to provide a dummy fusing signal to the OTP memory.

12. A system on chip (SoC) comprising:

a secure processor connected to a nonvolatile memory device storing a first event count, the secure processor configured to perform user authentication based on authentication data received from a user, wherein the secure processor further comprises:

a volatile memory configured to store a failure count, which increases based on a failure of the user authentication;

a one-time programmable (OTP) memory configured to store a second event count; and a security module configured to restrict the user authentication during a time period corresponding to the failure count when the failure count reaches a threshold value, wherein the security module is further configured to:

when the secure processor is in a power-on state, control the first and second event counts based on a throttle level corresponding to the failure count;

when a power-off request for the system on chip is generated, update the first event count based on the second event count; and when the secure processor is powered on after the system on chip is powered on, compare the first event count and second event count to determine whether a sudden power-off (SPO) event occurred.

13. The SoC of claim 12, wherein, when the secure processor is in the power-on state, the security module controls a difference between the first and second event counts to be corresponding to the throttle level.

14. The SoC of claim 12, wherein, when the SPO event is detected, the security module is further configured to:

increase the failure count based on a difference between the first event count and the second event count.

15. The SoC of claim 12, wherein the security module is further configured to:

perform the user authentication by determining whether a first passcode generated based on the authentication data corresponds to a second passcode stored in the nonvolatile memory device.

16. The SoC of claim 12, wherein the secure processor further comprises an encryption module, and wherein the first event count is stored in the nonvolatile memory device after being encrypted by the encryption module.

17. A method of operating a secure processor, which is included in a system on chip (SoC) connected with a nonvolatile memory device and includes a volatile memory and a one-time programmable (OTP) memory, the method comprising:

receiving a power-on request from the SoC after the SoC is powered on;

obtaining an authentication record stored in the nonvolatile memory device;

comparing a first event count included in the authentication record with a second event count stored in the OTP memory;

determining whether a sudden power-off (SPO) event occurred, based on a result of the comparing the first event count and the second event count;

based on a determination that the SPO event occurred, identifying a throttle level corresponding a failure count stored in the volatile memory before the occurrence of the SPO event, based on a difference between the first event count and the second event count;

increasing the failure count to a threshold value corresponding to the identified throttle level; and restricting user authentication during a time corresponding to the increased failure count.

18. The method of claim 17, further comprising:

performing the user authentication based on authentication data received from a user; and increasing the failure count when the user authentication fails and resetting the failure count when the user authentication succeeds.

19. The method of claim 17, wherein the authentication record is stored in the nonvolatile memory device after being encrypted based on the second event count.

20. The method of claim 17, further comprising:

when the occurrence of the SPO event is not detected, updating the second event count based on the authentication record backed up in the nonvolatile memory device.

\* \* \* \* \*